(12) United States Patent
Akiyama et al.

(10) Patent No.: US 9,573,473 B2
(45) Date of Patent: Feb. 21, 2017

(54) VEHICLE CONTROL DEVICE

(71) Applicant: Hitachi Automotive Systems, Ltd., Hitachinaka-shi, Ibaraki (JP)

(72) Inventors: Yuki Akiyama, Tokyo (JP); Toshiya Oosawa, Hitachinaka (JP); Atsushi Yokoyama, Tokyo (JP); Makoto Yamakado, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 43 days.

(21) Appl. No.: 14/646,275

(22) PCT Filed: Oct. 1, 2013

(86) PCT No.: PCT/JP2013/076691
§ 371 (c)(1),
(2) Date: May 20, 2015

(87) PCT Pub. No.: WO2014/080696
PCT Pub. Date: May 30, 2014

(65) Prior Publication Data
US 2015/0291038 A1    Oct. 15, 2015

(30) Foreign Application Priority Data

Nov. 21, 2012  (JP) .................................. 2012-254858

(51) Int. Cl.
*B60L 9/00*    (2006.01)
*G05D 1/00*    (2006.01)
(Continued)

(52) U.S. Cl.
CPC  *B60L 7/18* (2013.01); *B60L 3/10* (2013.01); *B60L 3/102* (2013.01); *B60L 3/106* (2013.01);
(Continued)

(58) Field of Classification Search
CPC combination set(s) only.
See application file for complete search history.

(56) References Cited

U.S. PATENT DOCUMENTS 6,236,926 B1    5/2001  Naitou
2014/0200787 A1   7/2014  Takahashi et al.

FOREIGN PATENT DOCUMENTS

DE    198 38 179 A1    3/1999
EP    2 351 678 A1    8/2011
(Continued)

OTHER PUBLICATIONS

International Search Report (PCT/ISA/210) dated Dec. 24, 2013, with English translation (Four (4) pages).
(Continued)

*Primary Examiner* — Bhavesh V Amin
(74) *Attorney, Agent, or Firm* — Crowell & Moring LLP

(57) ABSTRACT

In a vehicle control device, a slip ratio in which front and rear wheels are averaged, and a braking force in which the front and rear wheels are averaged, can be calculated. The vehicle control device is provided with: friction braking devices placed on each wheel; a motor that acts as a regenerative braking mechanism and is placed on the rear wheels; a vehicle slip stiffness calculation unit; a front and rear braking force ratio calculation unit; a vehicle slip stiffness correction unit; and a regenerative braking arithmetic unit. The regenerative braking arithmetic unit operates the friction braking device and the motor so as to make the vehicle slip stiffness reach a vehicle slip stiffness threshold value. Also, the vehicle slip stiffness correction unit corrects the vehicle slip stiffness threshold value in accordance with the ratio of the front wheel braking force and the rear wheel braking force.

16 Claims, 19 Drawing Sheets

(51) Int. Cl.
  *G06F 7/00*   (2006.01)
  *B60L 7/18*   (2006.01)
  *B60L 3/10*   (2006.01)
  *B60L 7/14*   (2006.01)
  *B60L 7/24*   (2006.01)
  *B60T 8/1766*  (2006.01)
  *B60W 40/068*  (2012.01)
  *B60T 8/1755*  (2006.01)

(52) U.S. Cl.
  CPC   *B60L 7/14* (2013.01); *B60L 7/24* (2013.01); *B60T 8/1755* (2013.01); *B60T 8/1766* (2013.01); *B60W 40/068* (2013.01); *B60L 2240/465* (2013.01); *B60L 2250/26* (2013.01); *B60L 2260/42* (2013.01); *B60T 2270/604* (2013.01); *B60T 2270/613* (2013.01)

(56) References Cited

FOREIGN PATENT DOCUMENTS

| | | |
|---|---|---|
| JP | 8-80832 A | 3/1996 |
| JP | 2001-18780 A | 1/2001 |
| JP | 2003-291790 A | 10/2003 |
| JP | 2006-34012 A | 2/2006 |
| JP | 2006-304599 A | 11/2006 |
| JP | 2007-282406 A | 10/2007 |
| JP | 2010-95098 A | 4/2010 |
| JP | 4920054 B2 | 10/2010 |
| WO | WO 2012/023162 A1 | 2/2012 |

OTHER PUBLICATIONS

Extended European Search Report issued in counterpart European Application No. 13856263.2 dated Nov. 2, 2016 (8 pages).

FRONT OF VEHICLE

FRONT OF VEHICLE

FRONT OF VEHICLE ←

VEHICLE CONTROL DEVICE

TECHNICAL FIELD

The present invention relates to a vehicle control device that controls braking/driving force of a vehicle.

BACKGROUND ART

In an electric vehicle (EV) or a hybrid electric vehicle (HEV) to be a vehicle using electric energy for an entire portion or a part of traveling power, a motor driving a traveling battery and tires is installed. When driving force is given to the tires, the motor converts electric energy of the battery into kinetic energy and consumes the kinetic energy. However, when braking force is given to the tires, the motor converts the kinetic energy into the electric energy and can charge the battery. An operation of the latter is referred to as energy regeneration (hereinafter, referred to as regeneration). Meanwhile, in friction braking in which the kinetic energy is converted into thermal energy, energy that becomes heat once and is radiated in the air cannot be reused. For this reason, in the EV or the HEV, to perform braking by regeneration as much as possible leads to energy saving.

In the vehicle, because the tires should generate braking/driving force and lateral force for turning, stable turning may be disabled when strong braking is performed. Even in this case, when the friction braking is performed, it is possible to perform control to generate the targeted braking force in a state in which the highest priority is given to stability of a vehicle behavior. However, when weight is laid on recovering of the energy by the regeneration, the vehicle behavior may be unstable.

Particularly, in a configuration of a driving system in which wheels driven by the motor enabling the regenerative braking are only two front wheels or two rear wheels, restrictions of the regenerative braking become remarkable to maintain the stability of the vehicle behavior.

As associated technology of this technical field, there is Patent Literature 1. In Patent Literature 1, a method of controlling regenerative braking force to correspond to a slip ratio of the wheels is disclosed.

In addition, there is Patent Literature 2 as technology becoming the basis of the present application. In Patent Literature 2, the regenerative braking is not premised, but a control method using a ratio of the wheel slip ratio to the braking force to maintain the stability of the vehicle behavior with an appropriate margin is disclosed.

CITATION LIST

Patent Literature

PATENT LITERATURE 1: JP-A-2006-304599
PATENT LITERATURE 2: JP-B2-04920054

SUMMARY OF INVENTION

Technical Problem

Because a sum of squares of the braking/driving force and the lateral force generated at the same time is determined as a characteristic of the tires used for the vehicle, it is necessary to balance improvement of the regenerative braking force to increase an energy regeneration amount and securing of the lateral force to stabilize the vehicle behavior.

Particularly, in the vehicle of the driving system configuration in which torque of the motor is transmitted to only the two front wheels or the two rear wheels, the regenerative braking force is generated at only any one side of the front side and the rear side and anteroposterior distribution of the braking force may be extremely deviated often even though the regenerative braking force and the friction breaking are used together. For this reason, the anteroposterior balance of the lateral force that can be generated may be greatly deviated necessarily. That is, because this becomes a very unfavorable condition in maintaining the stability of the vehicle behavior, this problem should be resolved by control of the braking force.

Because the technology described in Patent Literature 1 increases or decreases the braking force using only the slip ratio as an index, there is room for improvement in precision of maximum regenerative control.

In addition, the technology described in Patent Literature 2 is a method of handling the braking force for a collection of the four wheels and when the technology is applied to the regenerative braking, correspondence for the case in which the anteroposterior distribution of the braking force greatly changes is not sufficient and measures are necessary.

The present invention has been made in view of the above-described circumstances and an object of the present invention is to provide a vehicle control device that improves regenerative force while securing stability of a vehicle behavior and realizes energy saving.

Solution to Problem

In order to solve the above-described problem, a vehicle control device according to a present invention includes: friction braking mechanisms which are provided in front and rear wheels of a vehicle; a regenerative braking mechanism which is provided on at least one side of the front wheels and the rear wheels of the vehicle; an average wheel slip ratio calculating unit configured to calculate an average wheel slip ratio of wheel slip ratios of the individual wheels; an average braking/driving force calculating unit configured to calculate average braking/driving force of braking/driving force of the individual wheels; a vehicle slip stiffness calculating unit configured to calculate an inclination of a straight line coupling the coordinates determined by the average wheel slip ratio and the average braking/driving force and an original point, on a two-dimensional orthogonal coordinate system in which a vertical axis shows the average braking/driving force and a horizontal axis shows the average slip ratio, as slip stiffness of the vehicle; a ratio calculating unit configured to calculate a ratio of front wheel braking/driving force and rear wheel braking/driving force; a vehicle slip stiffness correcting unit configured to correct a control threshold value of the vehicle slip stiffness, according to the ratio of the front wheel braking/driving force and the rear wheel braking/driving force; and a braking/driving force commanding unit configured to operate the friction braking mechanisms and the regenerative braking mechanism, such that the vehicle slip stiffness becomes the control threshold value.

Advantageous Effects of Invention

By a control method capable of increasing regenerative braking force to a limit where stability of a vehicle behavior can be secured, restrictions of regenerative force by a configuration of a driving system can be alleviated and energy saving can be realized.

Other objects, features, and advantages of the present invention will become apparent from the following description of embodiments of the present invention in conjunction with the accompanying drawings.

DESCRIPTION OF EMBODIMENTS

Hereinafter, embodiments of a vehicle control device according to the present invention will be described using the drawings. Before specific embodiments are described, a phenomenon relating to the vehicle motion becoming the premise will be described.

If a vehicle generates braking/driving force during turning, the vehicle may show the unstable vehicle behavior due to a characteristic of tires. A braking method suitable for a motion state of the vehicle is established to some extent to maintain stability of the vehicle. However, in an EV performing energy regeneration, because an element called regenerative braking is added, the EV enters a braking state that is not ideal for securing the stability of the vehicle.

Figure 1:
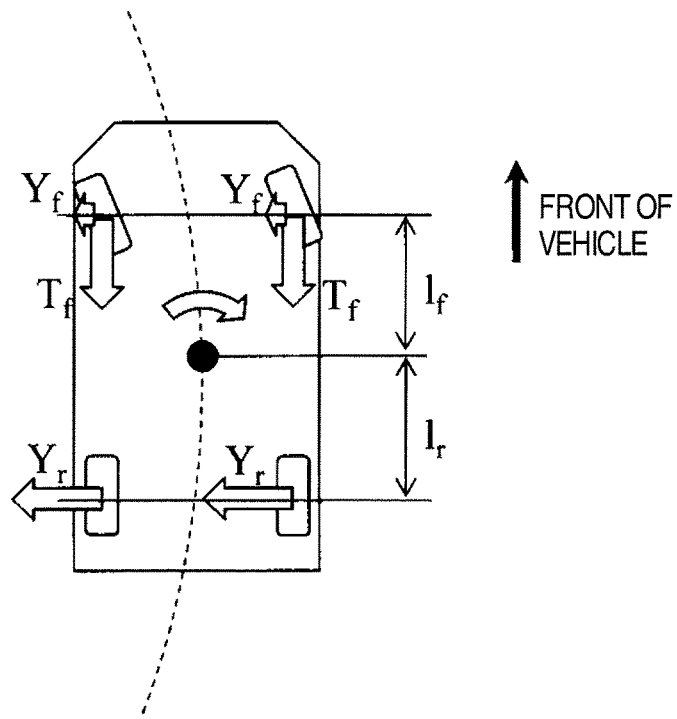
FIG. 1 is a diagram illustrating a drift-out behavior of a vehicle.
Figure 2:
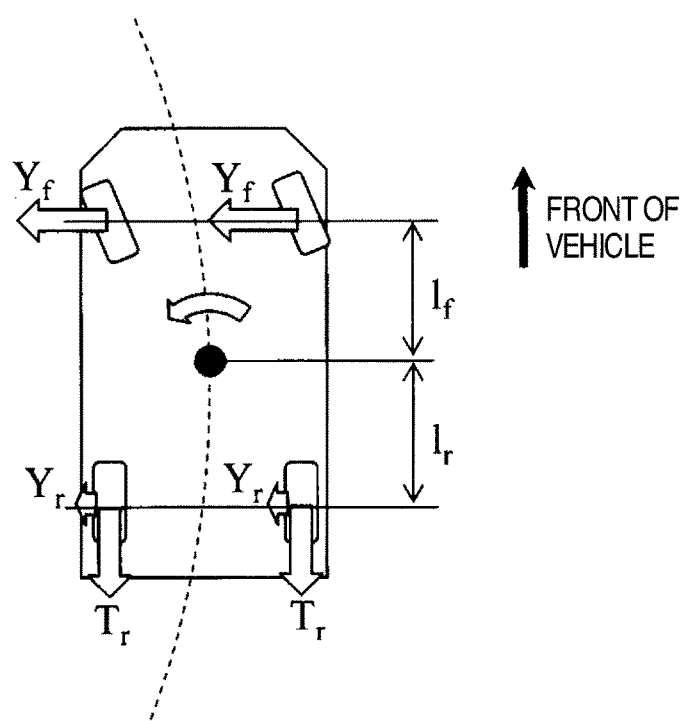
FIG. 2 is a diagram illustrating a spin behavior of the vehicle.

FIGS. 1 and 2 illustrate phenomena occurring in the vehicle during turning braking Yf shows lateral force of a front wheel, Yr shows lateral force of a rear wheel, Tf shows braking force of the front wheel, Tr shows braking force of the rear wheel, If shows a distance from a front wheel axle to the center of gravity, and Ir shows a distance from a rear wheel axle to the center of gravity. Yf and Yr show tend to decrease when Tf and Tr increase, respectively, which will be described below. Originally, Yf, Yr, Tf, and Tr are different in left and right wheels. However, Yf, Yr, Tf, and Tr are represented as an average amount of the left and right wheels by the same symbols. Here, the turning braking state is described as an example. However, if directions of Tf and Tr are reversed, Tf and Tr show the same phenomena in a turning driving state.

FIG. 1 illustrates the case in which the lateral force of the front wheel is insufficient and the front wheel cannot resist centrifugal force and a drift-out behavior flown to the outside of turning occurs. This is because Yf·lf −Yr·lr is a yawing moment, Yf·lf<Yr·lr is satisfied due to Tf, and a moment of a direction reverse to a direction of turning acts on the vehicle body.

FIG. 2 illustrates the case in which the lateral force of the rear wheel is insufficient and the rear wheel cannot resist centrifugal force and a spin behavior flown to the outside of the turning occurs. This is because Yf·lf >Yr·lr is satisfied due to Tr and a moment of the direction of the turning acts on the vehicle body.

The load moves from the rear wheel to the front wheel by braking, so that the reverse phenomenon where the lateral force that can be generated in the front wheel increases may also occurs. However, the present invention relates to the scene that may be easily generated when the braking force is extremely deviated often in the anteroposterior direction.

The behavior during the turning has been described. However, even in a straight line, the same state in which the lateral force capable of being generated decreases may be obtained and this case is easily affected by disturbance.

Because this phenomenon caused by the braking occurs due to a characteristic of the tires for the vehicle, this point will be described.

Figure 3:
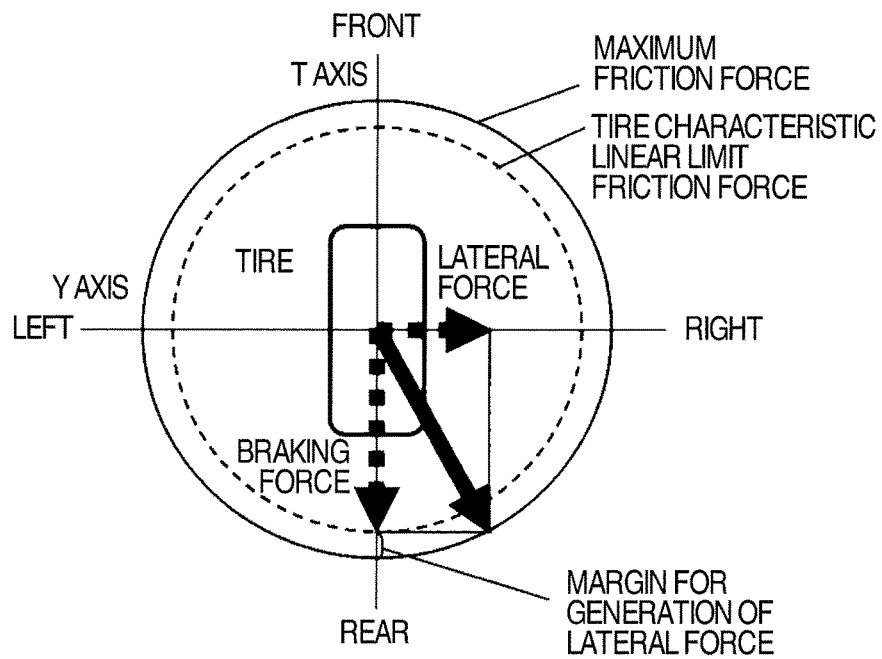
FIG. 3 is a diagram illustrating a relation of braking/driving force and lateral force of tires according to the present invention.

FIG. 3 illustrates a relation of the braking/driving force and the lateral force of the tires. A circle of a broken line of the inner side shows a linear area (described later) of the tires and a circle of a solid line of the outer side shows a friction force limit of the tires. According to a friction characteristic of the tires, there is the upper limit in a sum of squares of the braking/driving force and lateral force generated at the same time and a state reaching the upper limit is a state in which the friction force becomes the limit. The upper limit is obtained by multiplying a vertical load with a friction coefficient. From this relation, if only the braking force is used to the limit of the friction force, the lateral force capable of being generated may become 0 and the stability of the vehicle may not be maintained. In order to maintain the stability of the vehicle, the braking force needs to leave the margin to the limit of the friction force. If the braking force is kept in the linear area, the appropriate margin to generate the lateral force can be secured.

Figure 4:
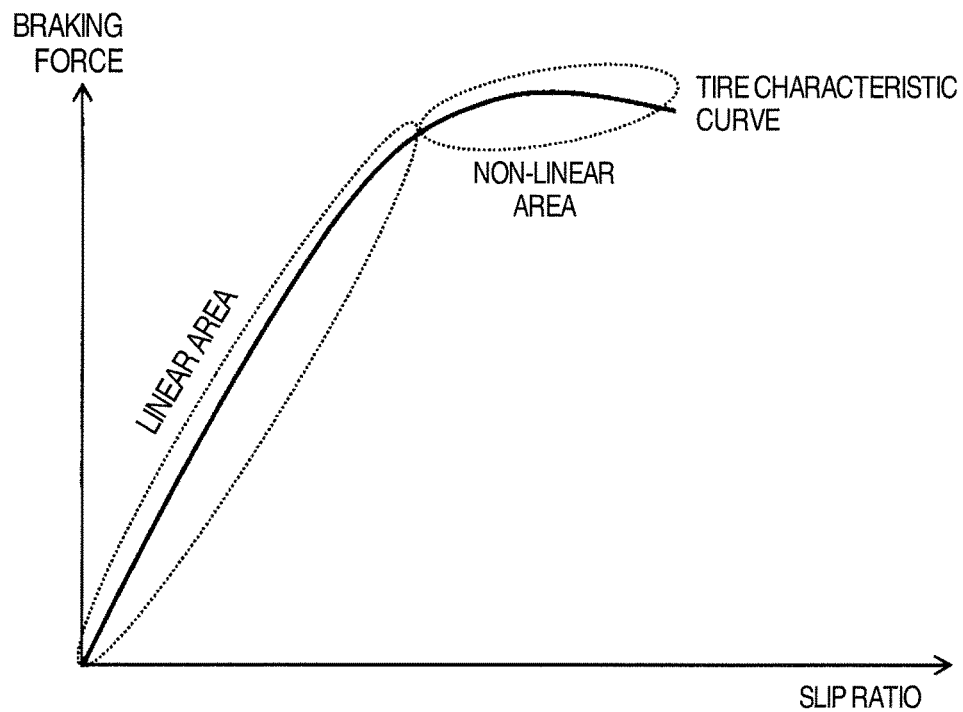
FIG. 4 is a diagram illustrating a tire characteristic curve according to the present invention.

FIG. 4 is a graph in which a horizontal axis shows a slip ratio of the vehicle and a vertical axis shows the braking force and a curve is generally called a tire characteristic curve.

The slip ratio is defined as follows. If an effective radius of the tire is set as R and the number of rotations is set as w, a wheel velocity Vw is represented as Vw=Rω. If a vehicle body velocity is set as V, a slip ratio Sw at the time of the braking is Sw=(V−Vw)/V. The definition of the slip ratio Sw at the time of driving is different from the definition of the slip ratio at the time of the braking and the slip ratio is Sw=(Vw−V)/Vw.

The tire characteristic curve can be divided into a linear area where the braking force increases to be approximately proportional to an increase in the slip ratio from an original point and a non-linear area where the increase in the braking force becomes dull for the increase in the slip ratio and when the slip ratio is not a slip ratio in which the braking force is maximized, the braking force decreases for the increase in the slip ratio. Even when the vertical axis shows the driving force, the same tire characteristic curve is drawn.

Roughly speaking, when the tires are used in the linear area, the vehicle does not cause the drift-out and the spin and the sufficient stability can be secured.

When an anti-lock brake system (ABS) operates, in the non-linear area, a target slip ratio is set to a slip ratio in which the braking force is almost maximized in the non-linear area and control is performed. Because the lateral force at that time becomes almost 0, this is not a state sufficient to maintain the stability of the vehicle.

The content of the present invention that improves the regenerative force while securing the stability of the vehicle on the basis of the above content will be described as embodiments hereinafter. As described in FIGS. 1 to 4, the braking force and the driving force can be handled symmetrically for the anteroposterior direction of the vehicle. Because the present invention puts importance on the regenerative braking, the embodiments illustrate a braking mode. However, the present invention can be applied as a method of maintaining the stability of the vehicle during driving.

First Embodiment

Figure 5:
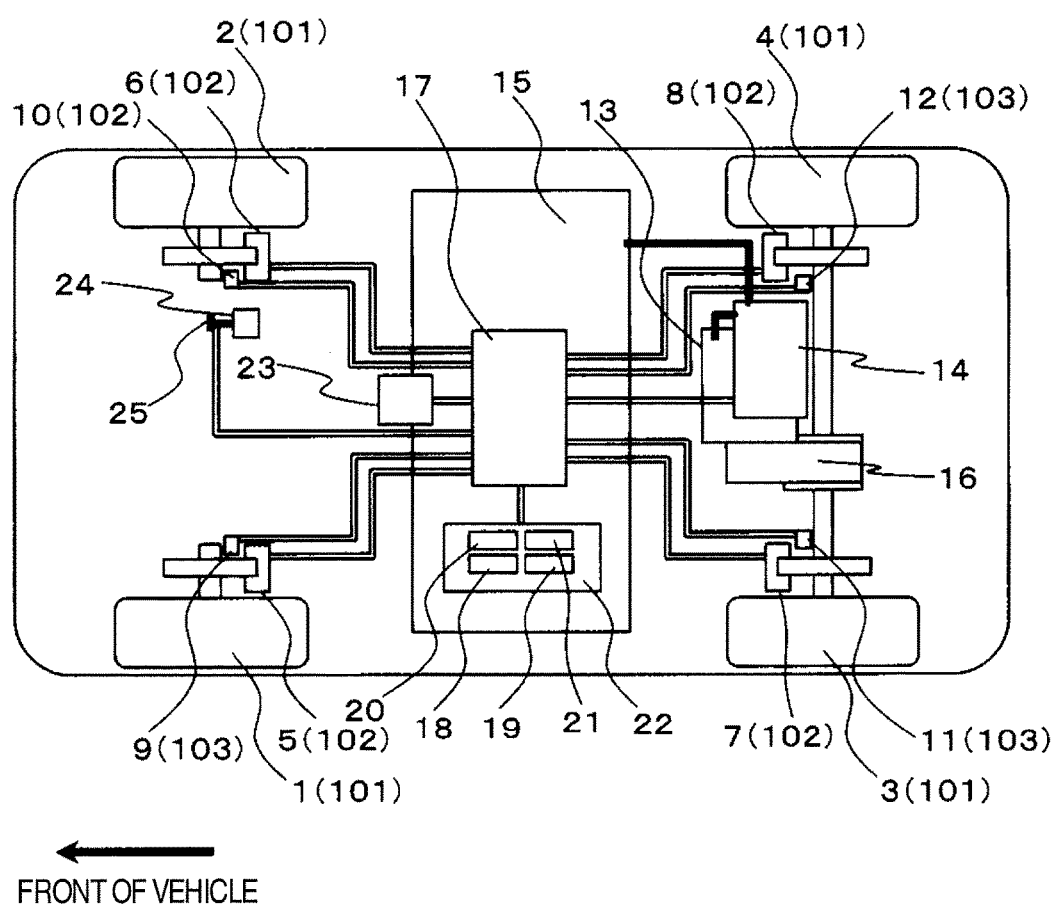
FIG. 5 is a configuration diagram of a rear-wheel-driven EV to which the present invention is applied.

FIG. 5 is a diagram illustrating a configuration of a rear-wheel-driven EV to which a vehicle control device according to the present invention is applied.

A motor 13 functioning as a regenerative braking mechanism is mounted on the rear side of the vehicle and an output thereof is transmitted from a gear box 16 having a differential gear provided therein to left and right rear wheels 3 and 4 through left and right driving shafts.

A battery 15 is mounted on about the center of the vehicle. When the driving force is given to the left and right rear wheels 3 and 4, direction-current force supplied by the battery 15 is converted into a three-phase alternating current by an inverter 14 mounted along the motor 13 to drive the motor 13. In contrast, when the regenerative braking force is given to the left and right rear wheels 3 and 4, the three-phase alternating current generated in the motor 13 is converted into a direct current by regenerative control of the inverter 14 and the direct current is charged in the battery 15. However, because power may not be received according to a state of the battery 15, the regeneration braking may not be performed at all times by restrictions of the side of the battery 15. The braking/driving torque or the number of rotations of the motor 13 is controlled by a command signal for the inverter 14. Because a current at the time of braking/driving can be measured through the inverter 14, information of the braking/driving torque generated by the motor 13 can be acquired.

For the braking, friction braking devices 102 (5 to 8) functioning as a friction braking mechanisms are provided in four wheels 101 (1 to 4), respectively, in addition to the regenerative braking by the motor 13. The friction braking device 102 is controlled by a brake ECU 17 and principally follows a command of the braking force of the front wheels 1 and 2 and the rear wheels 3 and 4 from a braking force command value setting unit 18 along a regenerative control operation device 22 to be an upper control device. However, if necessary, braking of the four wheels 101 can be performed in a state in which the priority is given to an operation of the ABS or an electronic stability control (ESC).

In addition, wheel velocity sensors 103 (9 to 12) are provided in the four wheels 101, respectively. In a vehicle slip stiffness calculating unit 19 provided in the regenerative control operation device 22, a slip ratio or slip stiffness of the vehicle and a vehicle slip stiffness threshold value to be described below are calculated using information of the wheel velocity sensor 103.

Specifically, because the slip ratio of the vehicle is a ratio of a deviation of the wheel velocity to the wheel velocity, at the time of braking, the wheel velocity of the wheel having the highest number of rotations is regarded as the vehicle velocity and a value obtained by dividing a difference of the wheel velocity and the vehicle velocity by a value regarded as the vehicle velocity is set as the slip ratio.

The slip stiffness shows an inclination at an original point of the tire characteristic curve. However, the slip stiffness in the present invention shows an inclination of a straight line coupling a point becoming the braking force to be a certain slip ratio and the original point, on the tire characteristic curve.

If the braking force is set to Fw and the slip ratio is set to Sw, the slip stiffness ks is represented as ks=Fw/Sw.

Because the slip ratio is non-dimensional and the braking force has a dimension of force, the slip stiffness has the dimension of the force.

The slip stiffness and the braking force can be acquired for each of the four wheels 101. However, because measurement noise is overlapped to values of the slip ratio and the braking force acquired in time series, similar to Patent Literature 2 described above, an average value of the four wheels 101 is used for the slip ratio and the braking force and is handled as the vehicle slip and stiffness, so that the reliability functioning as an index can be improved.

The regenerative control operation device 22 collectively processes information from each sensor by the braking force command value setting unit 18 provided therein and transmits a command signal to the inverter 14 and the brake ECU 17 to control the motor 13. The regenerative control operation device 22 functions as an independent computer in terms of hardware, in FIG. 5. However, a function as a program in any other ECU may be embedded.

In FIG. 5, 23 shows an acceleration sensor fixed to the vehicle and the acceleration sensor detects acceleration of the anteroposterior direction.

In FIG. 5, 24 shows a brake pedal. A stroke sensor 25 is provided in the brake pedal 24 and a stepping amount of the brake pedal 24 by a driver is detected. Information of the detected stepping amount is transmitted to the regenerative control operation device 22 and the regenerative control operation device 22 handles the information as driver request braking force and generates deceleration according to the intention of the driver as a basic operation of the braking force control.

Specifically, in the friction braking, because the wheel slip ratio is not excessive, a relation of a brake pressure and deceleration generated in the vehicle is previously acquired and a relation of a stepping amount of the brake pedal 24 and the deceleration is also set, so that the deceleration for the stepping amount of the brake pedal 24 is defined, and the deceleration corresponding to an operation amount of the driver is realized.

In addition, in the regenerative braking, because the same wheel slip ratio is not excessive, the regenerative braking torque corresponding to the operation of the brake pedal 24 is generated using a relation of the regenerative braking torque of the motor 13 and the deceleration of the vehicle and deceleration control according to the intention of the driver is performed.

Even when the friction braking and the regenerative braking act at the same time, the braking force may be distributed to both the friction braking and the regenerative braking and desired braking force can be generated by setting the friction braking and the regenerative braking with any ratio.

However, in both the friction braking and the regenerative braking, in a state in which the vehicle slip ratio is excessive, the vehicle deceleration cannot be designated directly. Thus, in such a situation, slip ratio control to be the ABS operation is performed by the brake ECU 17.

When the generated braking force is acquired, the braking torque of the motor 13 can be easily acquired through the inverter 14 for the regenerative braking force and thus, a value thereof corresponds to the braking force approximately. However, under a condition where an inertial moment of a rotation direction of the wheel cannot be ignored and the slip ratio is excessive, a difference with the braking force acting on the wheel increases.

Or, the braking force acting on the entire vehicle may be measured by the acceleration sensor 23, the regenerative braking force of the rear wheels 3 and 4 to be the driving wheels by the motor 13 may be acquired at the same time, and a difference of both sides may be calculated as the friction braking force generated in the front wheels 1 and 2 to be non-driving wheels.

Although not illustrated in FIG. 5, a sensor to measure the force, the torque, or the moment may be provided in a portion to which the braking force is transmitted and the braking force may be directly acquired.

Figure 6:
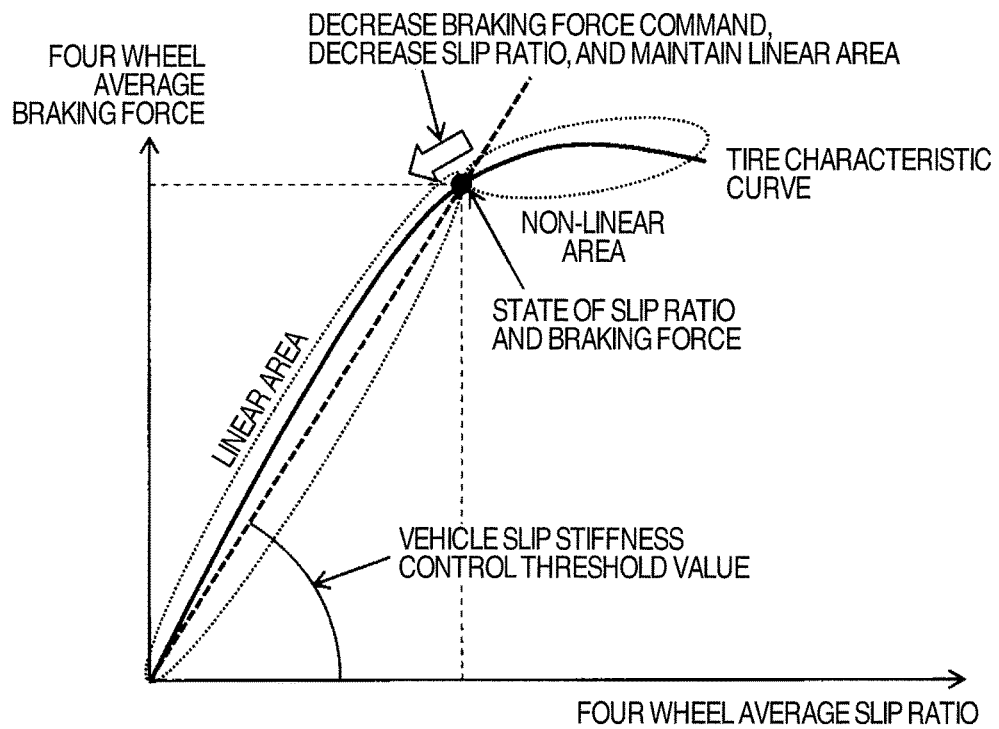
FIG. 6 is a diagram illustrating slip stiffness control according to the present invention.

FIG. 6 illustrates slip stiffness control to be technology becoming a basis of the present invention, using a tire characteristic curve.

An object of the slip stiffness control is to maintain a use range of the tires on the tire characteristic curve in a linear region. In the linear area and the non-linear area, because a degree of an increase in the braking force for an increase in the slip ratio is different, distinguishing of both sides can be determined by a difference of the inclination of a tangential line of the tire characteristic curve. However, it is necessary to partially differentiate the braking force with the slip ratio to acquire the inclination and the acquisition of the inclination is easily affected by the measurement noise. For this reason, it is difficult to use the inclination for control.

Therefore, the slip stiffness is used as an index. Because the slip stiffness used in the present invention is the inclination of a straight line coupling a point and an original point on the tire characteristic curve, the slip stiffness does not directly show a non-linear degree. However, because a shape of the tire characteristic curve is a convex curve passing the original point, a decrease degree of the slip stiffness at a use point for the slip stiffness at an approximately original point can be used as an index of the non-linear degree. For example, if a value of the slip stiffness at the use point is equal to a value of the slip stiffness at the approximately original point, an area is the linear area and when the value decreases, the area becomes an area where the non-linear degree is large. A determination method can be applied without depending on the road surface $\mu$.

Figure 7:
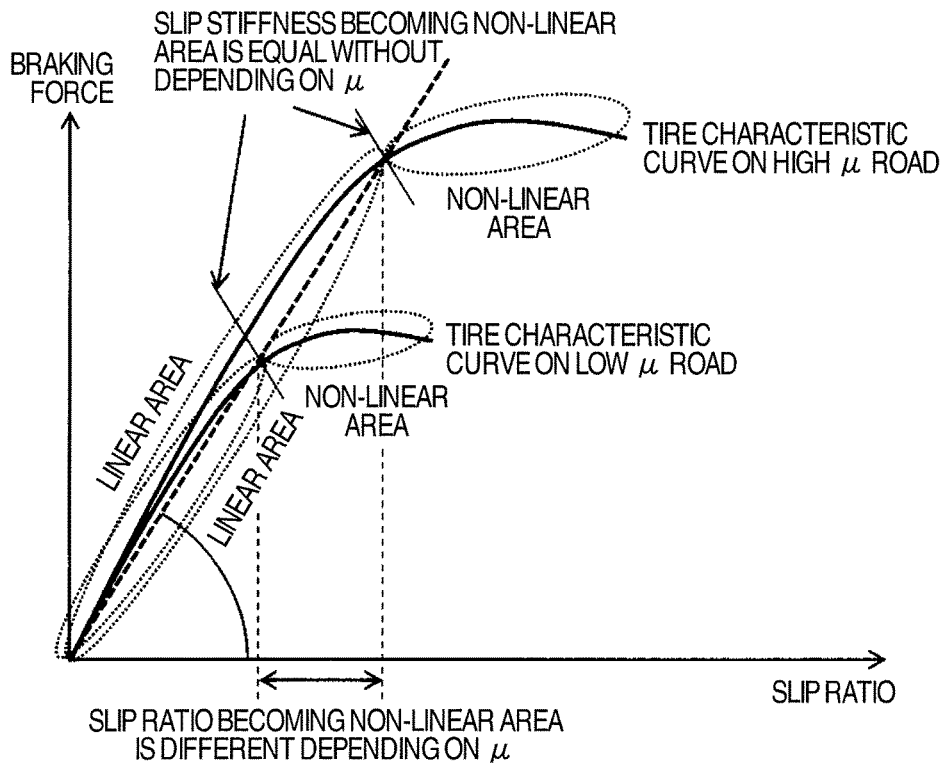
FIG. 7 is a diagram illustrating a difference of a tire characteristic curve by a road surface μ.

FIG. 7 illustrates a difference of a tire characteristic curve by a road surface $\mu$. The shape of the tire characteristic curve is not largely different. However, an area of the slip ratio becomes the non-linear area on a high $\mu$ road and an area where the slip ratio is small first becomes the non-linear area on a low $\mu$ road. For this reason, the determination using the slip ratios of the linear area and the non-linear area may be affected by the road surface $\mu$ when the slip stiffness is applied.

In contrast, if the area where the slip ratio is small becomes the non-linear area, the area can be estimated as the low μ road using the above content. Therefore, in the present invention, the μ estimation is performed using the phenomenon. A friction coefficient calculating unit that performs the μ estimation is included in a vehicle slip stiffness correcting unit 21.

Figure 8A:
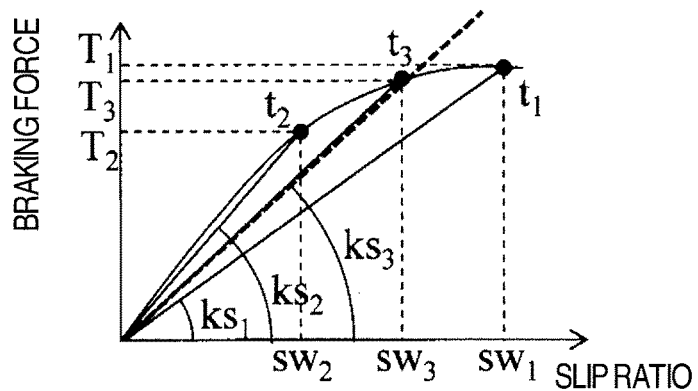
FIG. 8A is a diagram illustrating a method of controlling slip stiffness by a braking force command.
Figure 8B:
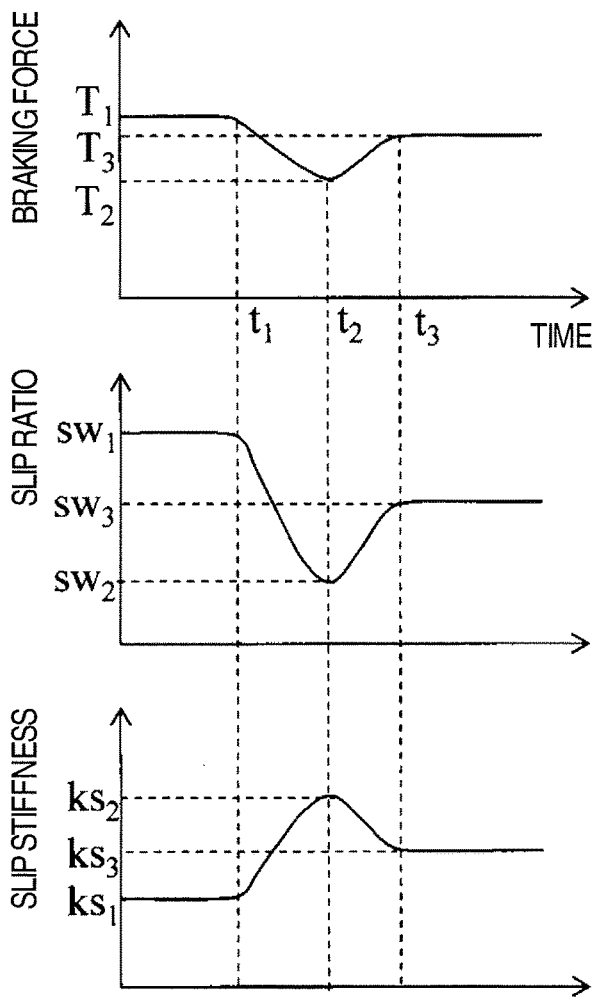
FIG. 8B is a diagram illustrating a method of controlling slip stiffness by a braking force command.

If the braking force changes, the slip ratio of the use point on the tire characteristic curve changes and the slip stiffness changes according to the change. Therefore, a braking force command value may be increased/decreased to control the slip stiffness. FIGS. 8A and 8B illustrate examples of the movement (FIG. 8A) of the use point on the tire characteristic curve and time histories (FIG. 8B) of the braking force, the slip ratio, and the slip stiffness over times t1 to t2 and t3. A target of the slip stiffness is assumed as ks3 and the slip stiffness in an initial state is assumed as a minute value ks1. Therefore, the braking force decreases from T1 to T2 over the times t1 to t2. At this time, the slip ratio changes from sw1 to sw2. As a result, the slip stiffness changes from ks1 to ks2. Here, because ks2 becomes excessively large, the braking force increases from T2 to T3 over the times t2 to t3. Likewise, at this time, the slip ratio changes from sw2 to sw3. As a result, the slip stiffness changes from ks2 to ks3.

As such, because the slip stiffness control based on the braking force command is enabled, a control target threshold value to maintain the slip stiffness to a certain value or more is set and when a value is smaller than the threshold value, the braking force is decreased and the stability of the vehicle can be secured.

In the rear-wheel-driven EV, the braking needs to be performed by the regenerative braking of the rear wheels 3 and 4 as much as possible for energy saving. However, there is a problem in that the stability of the vehicle should be maintained when the braking force of the rear wheels is increased. The regenerative braking force control based on the slip stiffness to be an operation according to this embodiment to resolve the above problem will be described.

When the maintenance of the stability of the vehicle and the deceleration are disabled by only the regenerative braking of the rear wheels 3 and 4 or in a state in which the battery 15 cannot sufficiently receive power generated by the regenerative braking, the friction braking devices 5 and 6 provided in the front wheels 1 and 2 are used together with the regenerative braking of the rear wheels 3 and 4.

When the slip stiffness is calculated from sensor information, the vehicle slip stiffness handled as the collection of the slip stiffness of the four wheels for the vehicle is obtained with highest precision from the average slip ratio of the four wheels 101 and the braking force acting on the vehicle and thus, the vehicle slip stiffness is acquired to be used for control, even in the configuration in which the regenerative braking is performed by only the rear wheels 3 and 4.

Figure 9A:
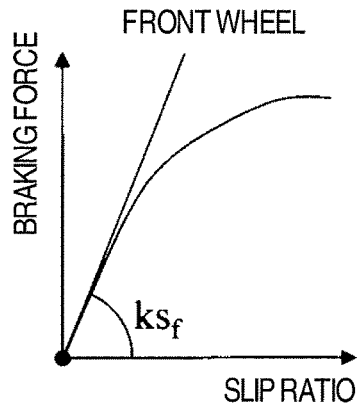
FIG. 9A is a diagram illustrating states of front and rear wheels on a tire characteristic curve in a first embodiment.
Figure 9B:
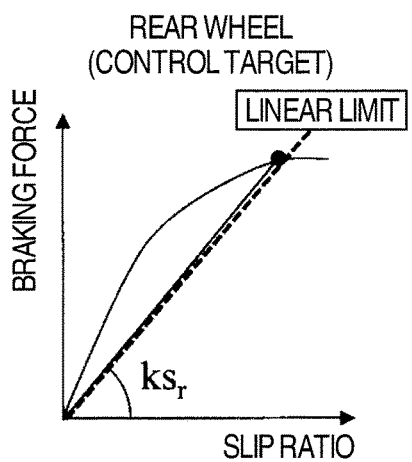
FIG. 9B is a diagram illustrating states of front and rear wheels on a tire characteristic curve in the first embodiment.
Figure 9C:
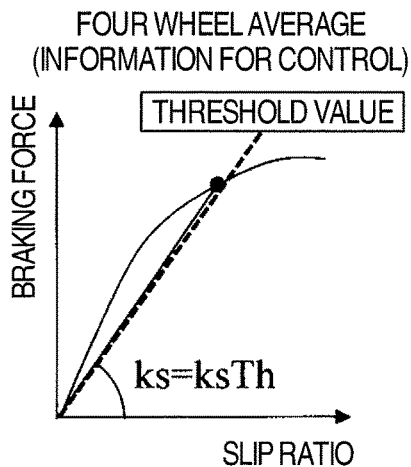
FIG. 9C is a diagram illustrating states of front and rear wheels on a tire characteristic curve in the first embodiment.

FIGS. 9A, 9B, and 9C illustrate states of the front and rear wheels on the tire characteristic curve when the vehicle slip stiffness ks is used for control of the rear wheel regenerative braking force and the braking is performed by only the regenerative braking of the rear wheels 3 and 4 and a state when the slip stiffness is handled as the collection of the slip stiffness of the front and rear wheels of the vehicle. Among the front and rear wheels and the vehicle slip stiffness, only a value of the vehicle slip stiffness ks calculated by the vehicle slip stiffness calculating unit 19 is used actually for the control.

Because the control command from the braking force command value setting unit 18 to the front wheel refection braking devices 5 and 6 is not output and the front wheels 1 and 2 do not perform the braking, the front wheel slip stiffness ksf in this state takes a maximum value with a largest margin to the non-linear area (FIG. 9A).

Meanwhile, the rear wheels 3 and 4 perform the regenerative braking according to the regenerative braking command from the braking force command value setting unit 18 and the rear wheel slip stiffness ksr is in a state of an allowable limit of the linear area (FIG. 9B). This is realized by setting the control target threshold value ksTh of the vehicle slip stiffness to a value where the rear wheel slip stiffness ksr becomes the linear limit (FIG. 9C). When the value is smaller than the threshold value ksTh, the rear wheel slip stiffness ksr is recovered by decreasing the regenerative braking force. That is, if the control target threshold value ksTh of the appropriate vehicle slip stiffness is given, control based on the vehicle slip stiffness ks of the rear wheel regenerative braking force is enabled. A value of ksTh corresponds to an average of initial ksf in which the braking of the front wheel is not performed and ksr in which the rear wheels become the allowable limit of the linear area.

Figure 10A:
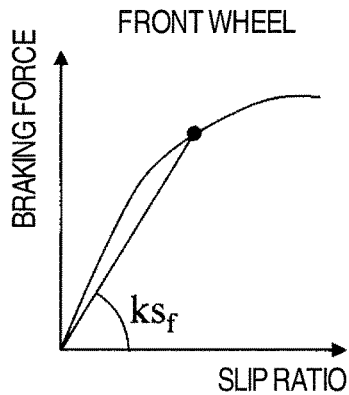
FIG. 10A is a diagram illustrating states of front and rear wheels on a tire characteristic curve under other condition in the first embodiment.
Figure 10B:
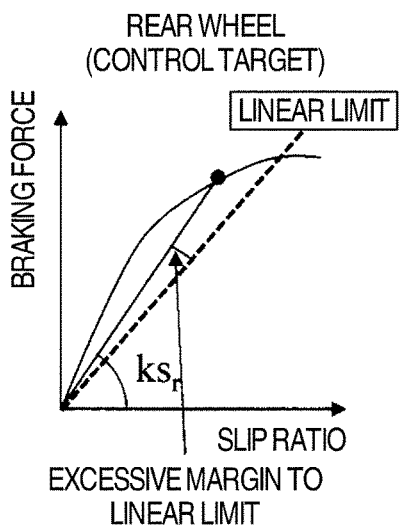
FIG. 10B is a diagram illustrating states of front and rear wheels on a tire characteristic curve under other condition in the first embodiment.
Figure 10C:
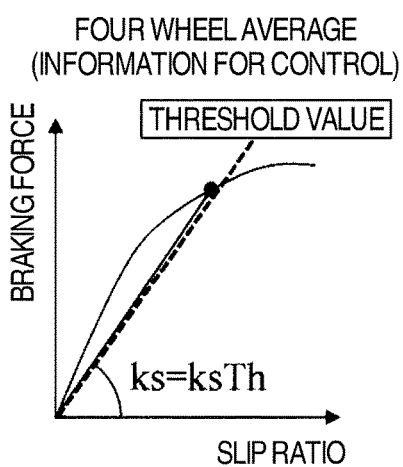
FIG. 10C is a diagram illustrating states of front and rear wheels on a tire characteristic curve under other condition in the first embodiment.

FIGS. 10A, 10B, and 10C illustrate states of the front and rear wheels on the tire characteristic curve when the vehicle slip stiffness ks is used for control of the rear wheel regenerative braking force and the regenerative braking of the rear wheels 3 and 4 and the friction braking of the front wheels 1 and 2 are performed, as a condition different from the condition of the above case.

In the front wheels 1 and 2, because the friction braking is performed, the front wheel slip stiffness ksf has a value smaller than the maximum value (FIG. 10A).

At this time, if the vehicle slip stiffness ks is in the same state as ks of FIG. 9C, the rear wheel slip stiffness ksr is larger than ksr of FIG. 9B (FIG. 10B). This is because a decrease amount of the front wheel slip stiffness ksf of FIG. 10A from ksf of FIG. 9A and an increase amount of the rear wheel slip stiffness ksr of FIG. 10B from ksr of FIG. 9B tend to be offset. This is realized by setting the control target threshold value ksTh of the vehicle slip stiffness to a value in which the rear wheel slip stiffness ksr becomes the linear limit (FIG. 10C).

That is, when the braking force ratio of the front and rear wheels is changed by using the friction braking of the front wheels 1 and 2 as well as the regenerative braking in only the rear wheels 3 and 4 even though the vehicle slip stiffness ks is controlled to a certain constant value, the slip stiffness ksr of the rear wheel cannot be accurately controlled. In this case, the margin to maintain the rear wheels 3 and 4 in the linear area is excessively large and the regenerative force is excessively suppressed.

A method of corresponding to the above point by correction of a threshold value having considered a change in the braking force ratio will be described.

Figure 11A:
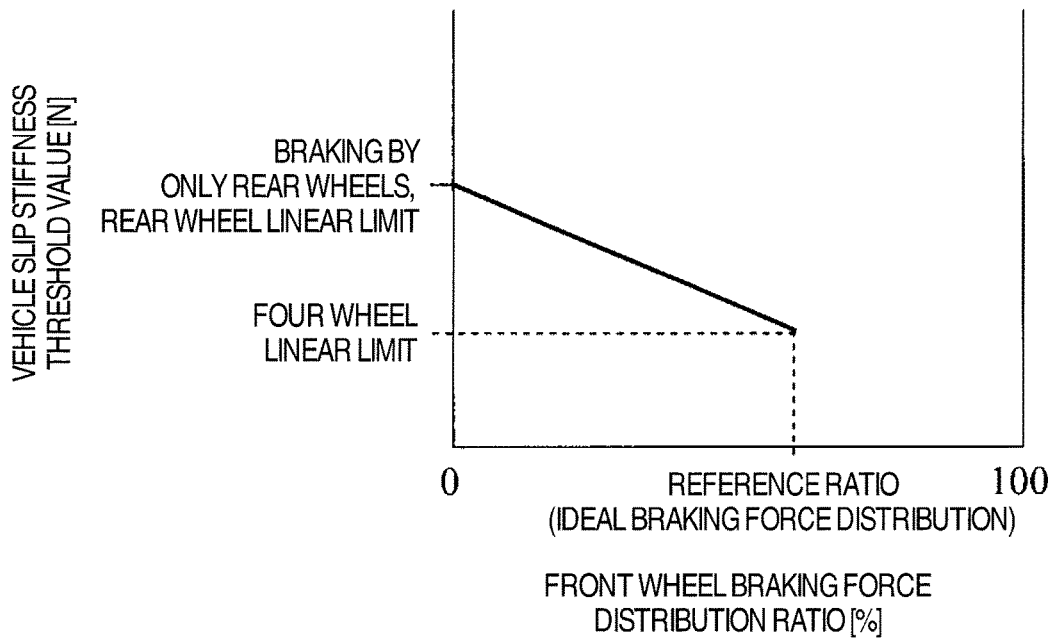
FIG. 11A is a diagram illustrating a method of correcting a vehicle slip stiffness threshold value in the first embodiment.
Figure 11B:
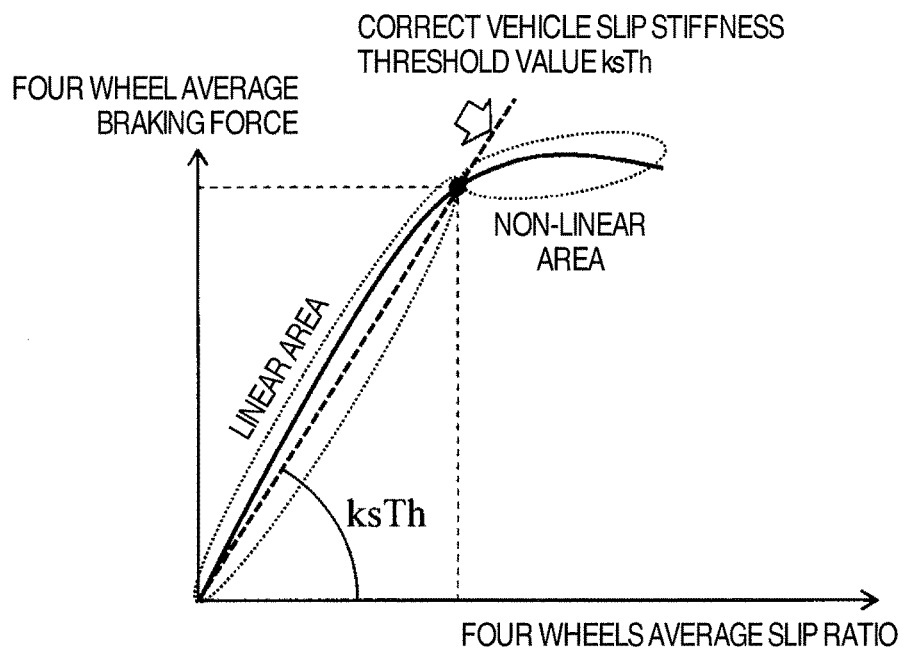
FIG. 11B is a diagram illustrating a method of correcting a vehicle slip stiffness threshold value in the first embodiment.

FIGS. 11A and 11B illustrate a method of correcting the vehicle slip stiffness threshold value for the braking force ratio of the front and rear wheels calculated by a front/rear wheel braking force ratio calculating unit 20 to be a ratio calculating unit.

A ground load of the static or dynamic tires also exerts influence. However, a state in which ideal braking force distribution in which the slip ratios of the front and rear wheels are equal to each other is enabled is used as a reference ratio of the front/rear wheel braking force ratio. This state corresponds to a state by a pressure reception area of a piston and a dimension and a material of a friction sliding portion, when braking to make the same pressure act on front and rear wheels is performed in a friction braking device in which a liquid pressure is transmitted to each wheel, a sliding portion of a friction material is pushed by the piston converting the liquid pressure and generating force, and braking force is generated. In the same state, the slip stiffness of the front wheel and the slip stiffness of the rear wheel have almost the same value and reach the limit of the linear area almost at the same time. For this reason, the vehicle slip stiffness calculating unit 19 may calculate reference slip stiffness from the reference ratio and may control a value thereof as a control threshold value of the vehicle slip stiffness.

Meanwhile, in a state in which the braking force ratio of the rear wheels 3 and 4 is larger than the reference ratio, because the vehicle slip stiffness tends to be increased due to the large slip stiffness of the front wheels 1 and 2, a setting value of the vehicle slip stiffness threshold value is corrected with a value larger than the setting value at about the ideal braking force distribution used as the reference slip stiffness with the vehicle slip stiffness correcting unit 21 (FIG. 11A).

When the deceleration requested by the driver is not obtained by control of the vehicle slip stiffness, the friction braking force of the front wheels 1 and 2 is strengthened, so that the deceleration is obtained in conjunction with the regenerative braking force of the rear wheels 3 and 4, and this state is reflected in setting of the vehicle slip stiffness threshold value through the front/rear wheel braking force ratio calculating unit 20 (FIG. 11B).

The reference ratio of the front/rear wheel braking force when the reference slip stiffness is set may be corrected according to a vehicle state affecting the ground load of the static or dynamic tire. A reference ratio calculating unit that corrects the reference ratio is included in the vehicle slip stiffness correcting unit 21. For example, the deceleration is calculated from a detection value of the acceleration sensor 23 by a deceleration calculating unit and a ground load variation is corrected. Or, the road surface $\mu$, is estimated from the relation of the slip stiffness or the slip ratio and the braking force by the friction coefficient calculating unit, the deceleration that can be generated is calculated, and the assumed ground load variation is corrected. Thereby, high-precision control is performed.

Figure 12A:
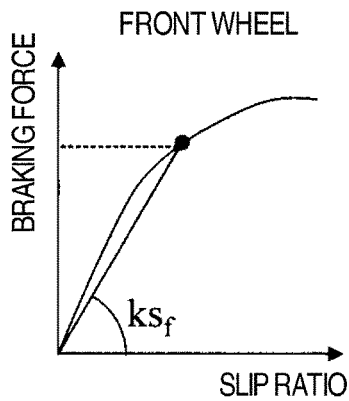
FIG. 12A is a diagram illustrating states of front and rear wheels when a method of correcting a vehicle slip stiffness threshold value in the first embodiment is applied.
Figure 12B:
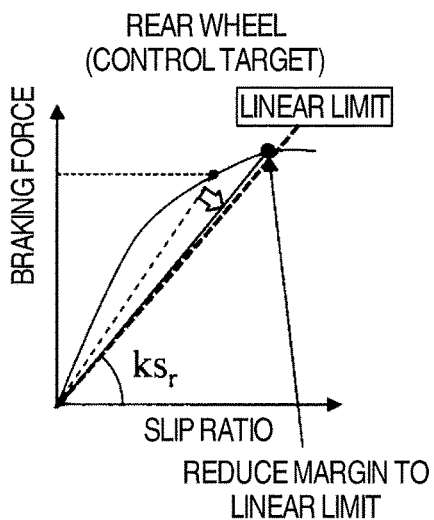
FIG. 12B is a diagram illustrating states of front and rear wheels when a method of correcting a vehicle slip stiffness threshold value in the first embodiment is applied.
Figure 12C:
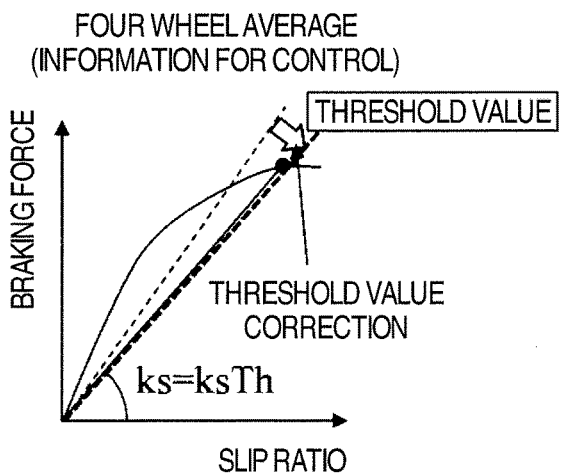
FIG. 12C is a diagram illustrating states of front and rear wheels when a method of correcting a vehicle slip stiffness threshold value in the first embodiment is applied.

FIGS. 12A, 12B, and 12C illustrate states of the front and rear wheels on the tire characteristic curve when the friction braking is performed by the front wheels 1 and 2 in addition to the regenerative braking of the rear wheels 3 and 4, in the case in which correction of the vehicle slip stiffness threshold value is applied. In the front wheels 1 and 2, because the friction braking is performed, the front wheel slip stiffness ksf has a value smaller than a maximum value (FIG. 12A). The threshold value is corrected by the above method according to the braking force ratio of the front and rear wheels (FIG. 12C), so that the deceleration requested by the driver is obtained while stability of the vehicle behavior in which the regenerative braking is performed by the rear wheels 3 and 4 is maintained, using the vehicle slip stiffness as an index, and the regenerative force can be improved (FIG. 12B).

As such, the vehicle can calculate the average slip ratio of the four wheels 101 and the average braking force of the four wheels 101. The vehicle includes the friction braking devices 102 that become the friction braking mechanisms provided in the four wheels 101, the motor 13 that becomes the regenerative braking mechanism provided in at least one side of the front wheels 1 and 2 and the rear wheels 3 and 4, the vehicle slip stiffness calculating unit 19, the front/rear wheel braking force ratio calculating unit 20 that becomes the ratio calculating unit, the vehicle slip stiffness correcting unit 21, and the regenerative control operation device 22 that is the braking/driving force command value setting unit.

The vehicle slip stiffness calculating unit 19 calculates an inclination of a straight line coupling the coordinates determined by the average wheel slip ratio and the average braking force and the original point, on a two-dimensional orthogonal coordinate system in which a vertical axis shows average braking force and a horizontal axis shows an average slip ratio, as the slip stiffness of the vehicle. The regenerative control operation device 22 operates the friction braking device 102 and the motor 13, such that the vehicle slip stiffness becomes the vehicle slip stiffness threshold value. In addition, the vehicle slip stiffness correcting unit 21 corrects the vehicle slip stiffness threshold value according to the ratio of the front wheel braking force and the rear wheel braking force.

The vehicle slip stiffness threshold value is obtained by correcting the reference slip stiffness to be the vehicle slip stiffness when the slip ratios of the front wheels 1 and 2 and the rear wheels 3 and 4 are equal to each other, according to the ratio calculated by the front/rear wheel braking force ratio calculating unit 20.

Thereby, the regenerative braking force can be strengthened to the limit where the stability of the vehicle behavior can be secured and energy saving can be realized.

Particularly, in the vehicle that performs the regeneration by only the rear wheels 3 and 4 in which the vehicle behavior is easy to become unstable, a highest effect is obtained. In addition, in the vehicle that performs the regeneration by only the front wheels 1 and 2 or the vehicle that performs the regeneration by the front and rear wheels, but has restrictions on the anteroposterior distribution, the effect can be obtained.

As compared with slip stiffness control to which the present invention is not applied, the regenerative force can be improved in a state in which the stability of the vehicle behavior is equally maintained.

The use to the control of the slip stiffness is based on the vehicle slip stiffness. However, when the influence of the noise is sufficiently suppressed even though the four wheels 101 are not collectively handled and the information of the braking force and the slip ratio of each wheel is acquired to be used for the control, the following method can be taken.

Figure 13:
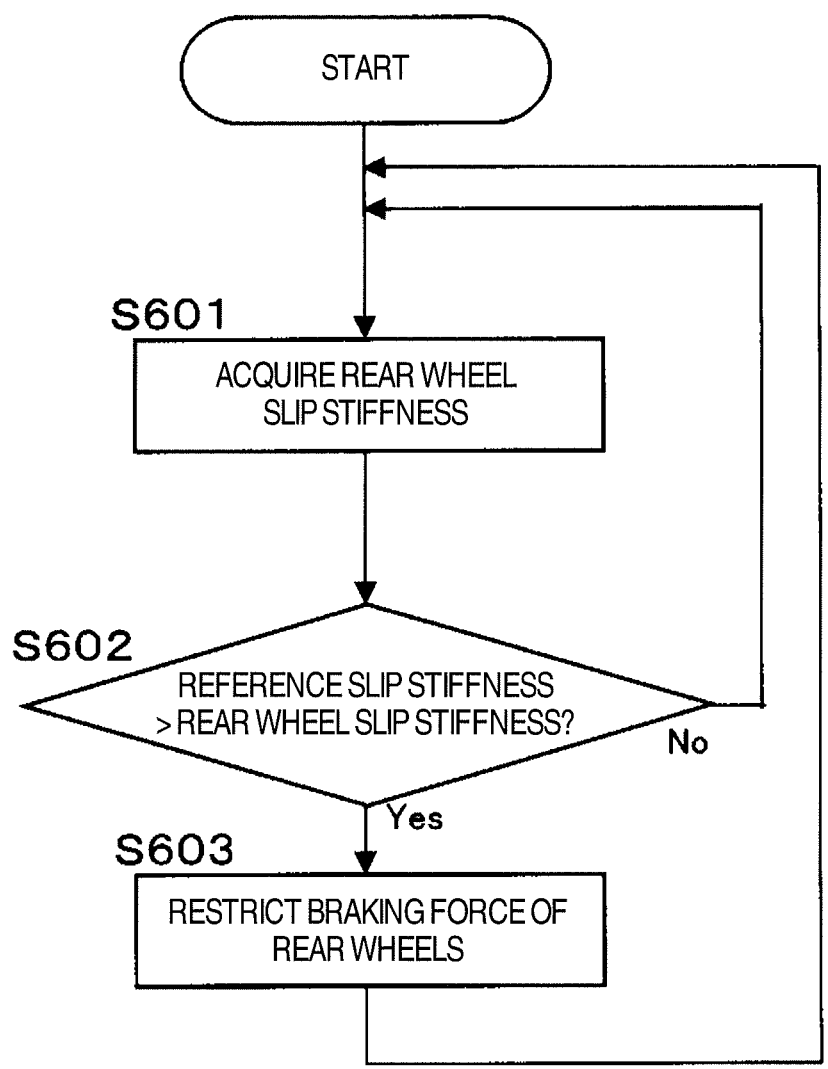
FIG. 13 is a control flowchart of the case in which rear wheel slip stiffness can be acquired.

FIG. 13 is a flowchart illustrating an operation when the rear wheel slip stiffness can be acquired.

The information of the rear wheel slip stiffness is acquired (S601) and when the rear wheel slip stiffness is smaller than the reference slip stiffness (S602), the braking force of the rear wheels 3 and 4 is restricted (S603). An object of the operation is to maintain the states of the rear wheels 3 and 4 on the tire characteristic curve in the linear area.

Figure 14:
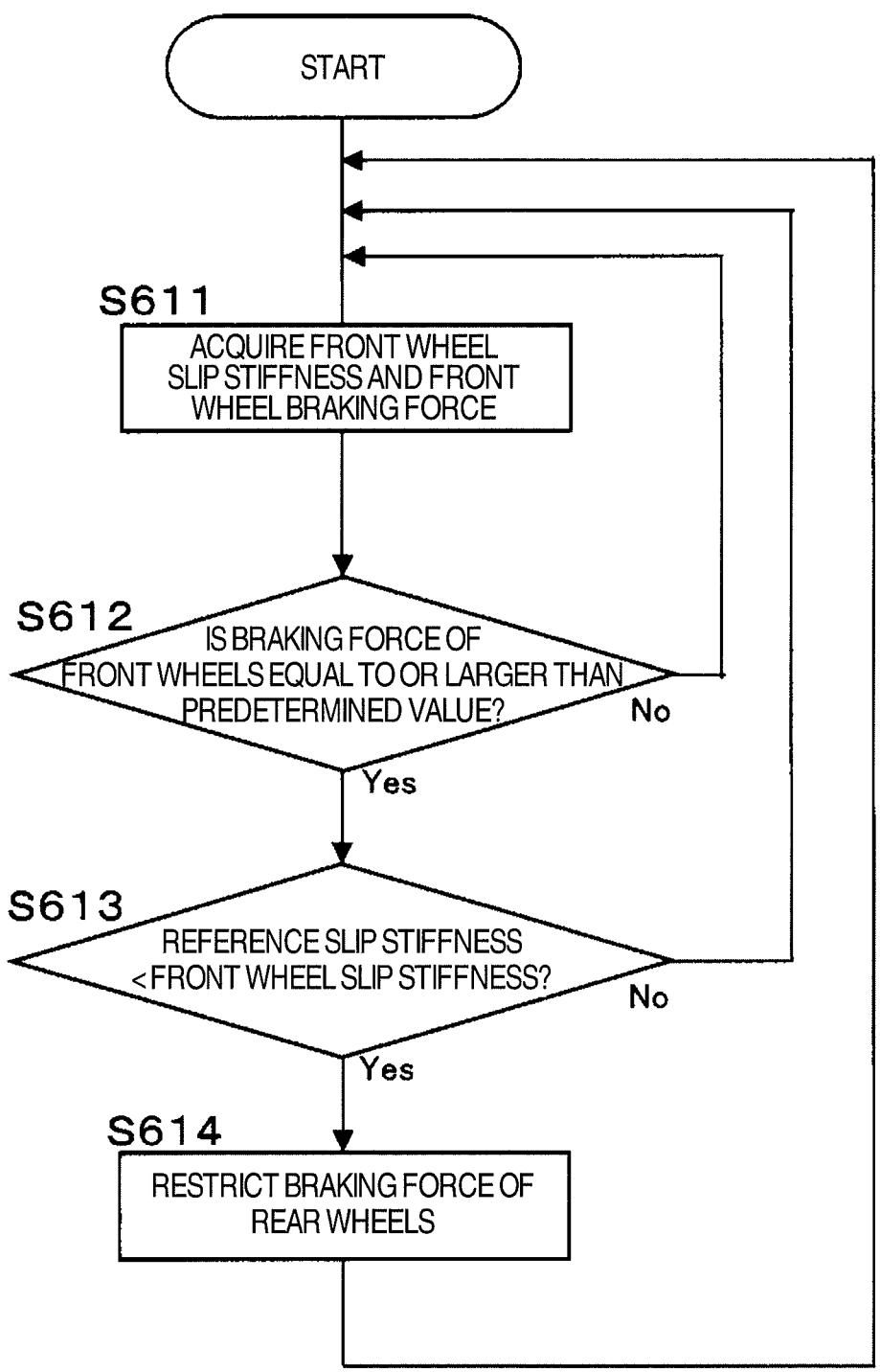
FIG. 14 is a control flowchart of the case in which front wheel slip stiffness can be acquired.

FIG. 14 is a flowchart illustrating an operation when the front wheel slip stiffness can be acquired.

The information of the front wheel slip stiffness is acquired (S611) and when the braking force of the front wheels 1 and 2 is equal to or larger than a predetermined value (S612) and the front wheel slip stiffness is larger than the reference slip stiffness (S613), the braking force of the rear wheels 3 and 4 is restricted (S614).

A state in which the front wheel slip stiffness is larger than the reference slip stiffness even though the braking force of the front wheels 1 and 2 is not small means that the rear wheel slip stiffness becomes small relatively. In this case, the braking force of the rear wheels 3 and 4 is restricted, so that the states of the rear wheels 3 and 4 on the tire characteristic curve are maintained in the linear area.

Figure 15:
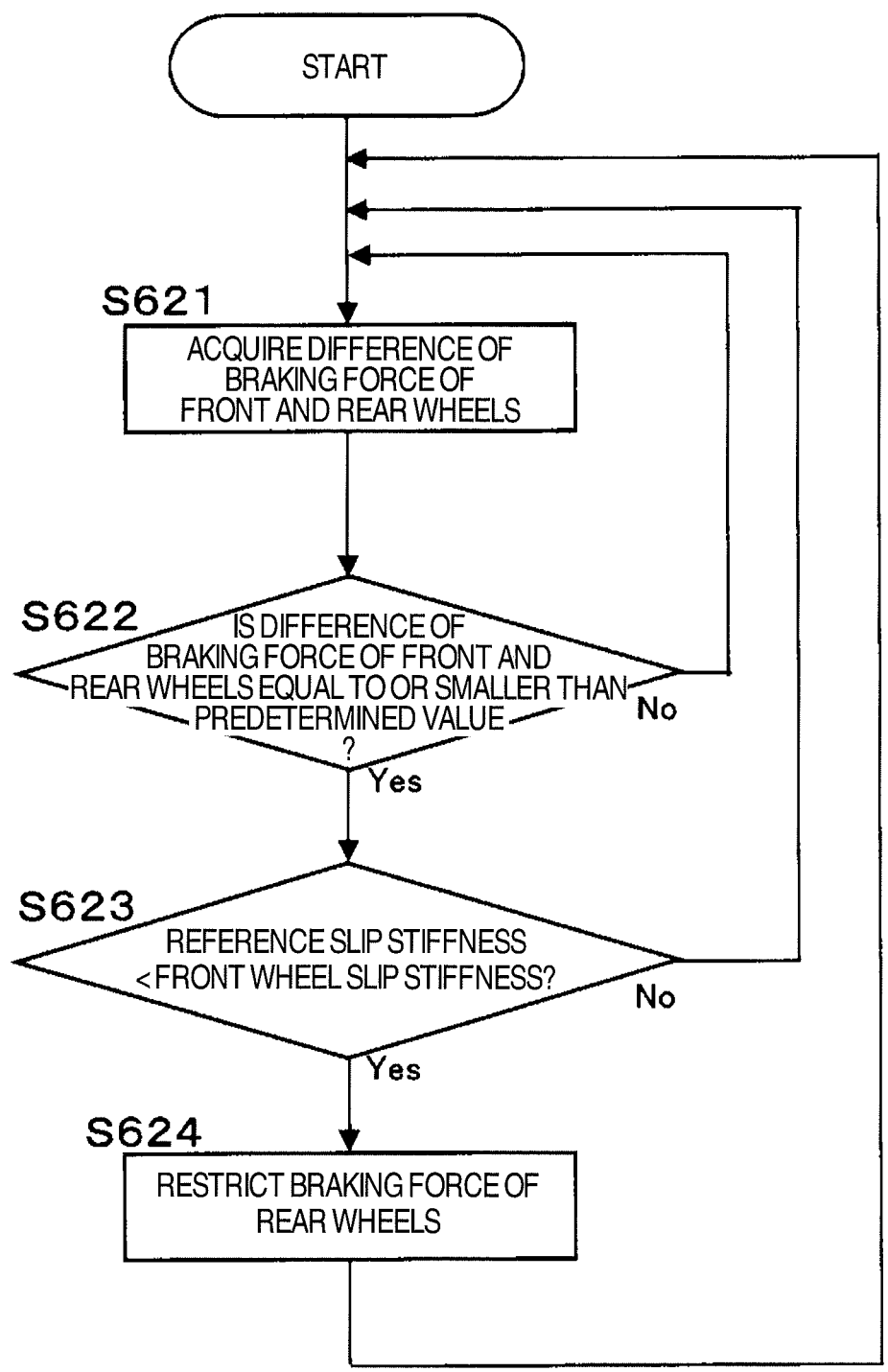
FIG. 15 is a control flowchart of the case in which a difference of braking force of front and rear wheels can be acquired.

FIG. 15 is a flowchart illustrating an operation when reliable information of a difference of the braking force of the front and rear wheels can be acquired.

The information of the difference of the braking force of the front and rear wheels is acquired (S621) and when the difference of the braking force of the front and rear wheels is equal to or smaller than a predetermined value (S622) and the front wheel slip stiffness is larger than the reference slip stiffness (S623), the braking force of the rear wheel is restricted (S624).

A state in which the front wheel slip stiffness is larger than the reference slip stiffness even though the braking force of the front wheels 1 and 2 is not small with respect to the rear wheels 3 and 4 means that the rear wheel slip stiffness becomes small relatively. Therefore, the braking force of the rear wheels 3 and 4 is restricted, so that the states of the rear wheels 3 and 4 on the tire characteristic curve are maintained in the linear area.

Hereinafter, the other embodiments of the present invention will be described. However, the same components as those of the first embodiment are denoted with the same reference numerals and overlapped explanation is omitted.

Second Embodiment

Figure 16:
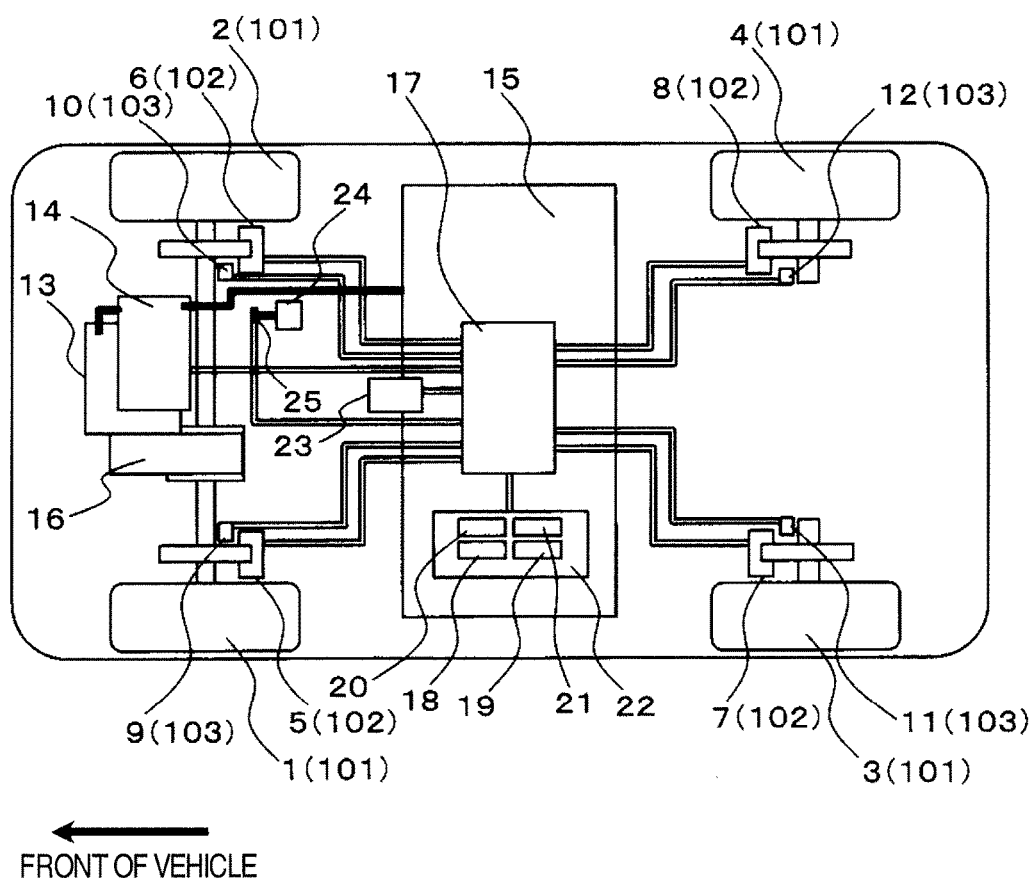
FIG. 16 is a configuration diagram of an EV according to a second embodiment to which the present invention is applied.

FIG. 16 corresponds to a second embodiment and illustrates a configuration of a front-wheel-driven EV to which a vehicle control apparatus according to the present invention is applied. The configuration is different from the configuration of the first embodiment in that regenerative braking is performed by front wheels 1 and 2.

Figure 17A:
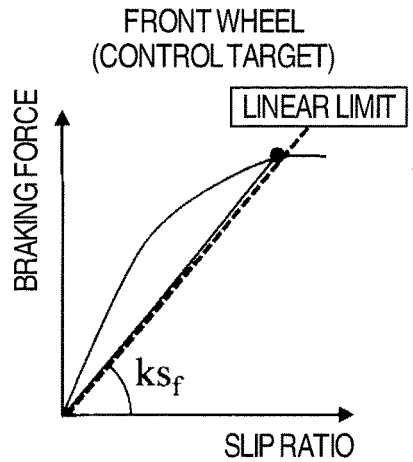
FIG. 17A is a diagram illustrating states of front and rear wheels on a tire characteristic curve in the second embodiment.
Figure 17B:
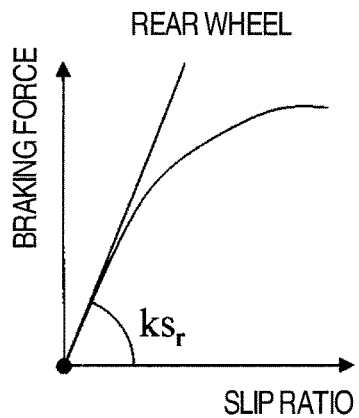
FIG. 17B is a diagram illustrating states of front and rear wheels on a tire characteristic curve in the second embodiment.
Figure 17C:
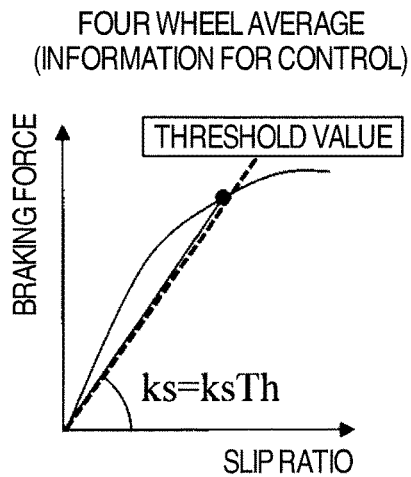
FIG. 17C is a diagram illustrating states of front and rear wheels on a tire characteristic curve in the second embodiment.

FIGS. 17A, 17B, and 17C illustrate states of the front and rear wheels on a tire characteristic curve when vehicle slip stiffness ks is used for control of front wheel regenerative braking force and braking is performed by only regenerative braking of the front wheels 1 and 2 and a state when the front and rear wheels of the vehicle are collectively handled.

Because a breaking command from a braking force command value setting unit 18 to the rear wheels 3 and 4 is not output and the rear wheels 3 and 4 do not perform the braking, rear wheel slip stiffness ksr in this state takes a maximum value with a largest margin to a non-linear area (FIG. 17B).

Meanwhile, front wheels 201 and 202 performs regenerative braking according to a regenerative braking command from a braking force command value setting unit 218 and the front wheel slip stiffness ksf is in a state of an allowable limit of the linear area (FIG. 17A). This is realized by setting a control target threshold value ksTh of the vehicle slip stiffness to a value where the rear wheel slip stiffness ksr becomes a linear limit (FIG. 17C). A method of performing control based on the vehicle slip stiffness ks of the front wheel regenerative braking force is the same as the method according to the first embodiment.

Figure 18A:
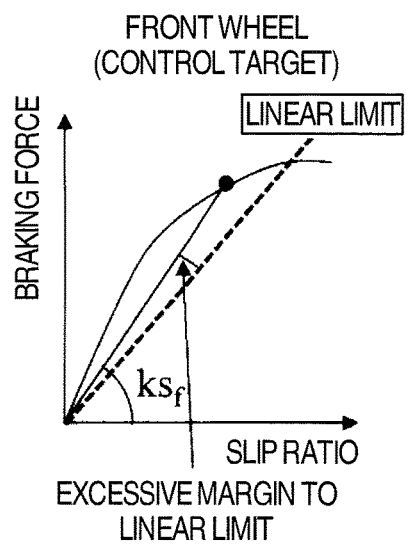
FIG. 18A is a diagram illustrating states of front and rear wheels on a tire characteristic curve under other condition in the second embodiment.
Figure 18B:
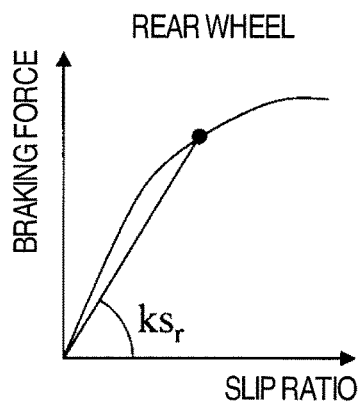
FIG. 18B is a diagram illustrating states of front and rear wheels on a tire characteristic curve under other condition in the second embodiment.
Figure 18C:
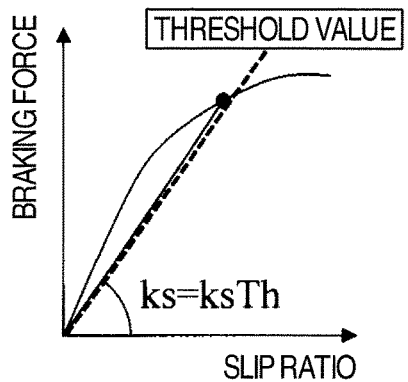
FIG. 18C is a diagram illustrating states of front and rear wheels on a tire characteristic curve under other condition in the second embodiment.

FIGS. 18A, 18B, and 18C illustrate states of the front and rear wheels on the tire characteristic curve when the vehicle slip stiffness ks is used for control of the front wheel regenerative braking force and friction braking of the rear wheels 3 and 4 is performed in addition to the regenerative braking of the front wheels 1 and 2.

In the rear wheels 3 and 4, because the friction braking is performed, the rear wheel slip stiffness ksr has a value smaller than a maximum value (FIG. 18B).

At this time, if the vehicle slip stiffness ks is in the same state as ks of FIG. 17C, the front wheel slip stiffness ksf is larger than ksf of FIG. 17A (FIG. 18A). This is because a decrease amount of the rear wheel slip stiffness ksr of FIG. 18B from ksr of FIG. 17B and an increase amount of the front wheel slip stiffness ksf of FIG. 18A from ksf of FIG. 17A tend to be offset, similar to the first embodiment. In the second embodiment, because ground loads of the front wheels 1 and 2 of the regenerative braking wheels increases at the time of braking and ground loads of the rear wheels 3 and 4 decreases at the time of braking, a changes in the slip stiffness of the front and rear wheels for the case of performing only the front wheel regenerative braking are promoted and an influence increases as compared with the first embodiment. For this reason, a correction amount for the reference slip stiffness also increases.

Figure 19:
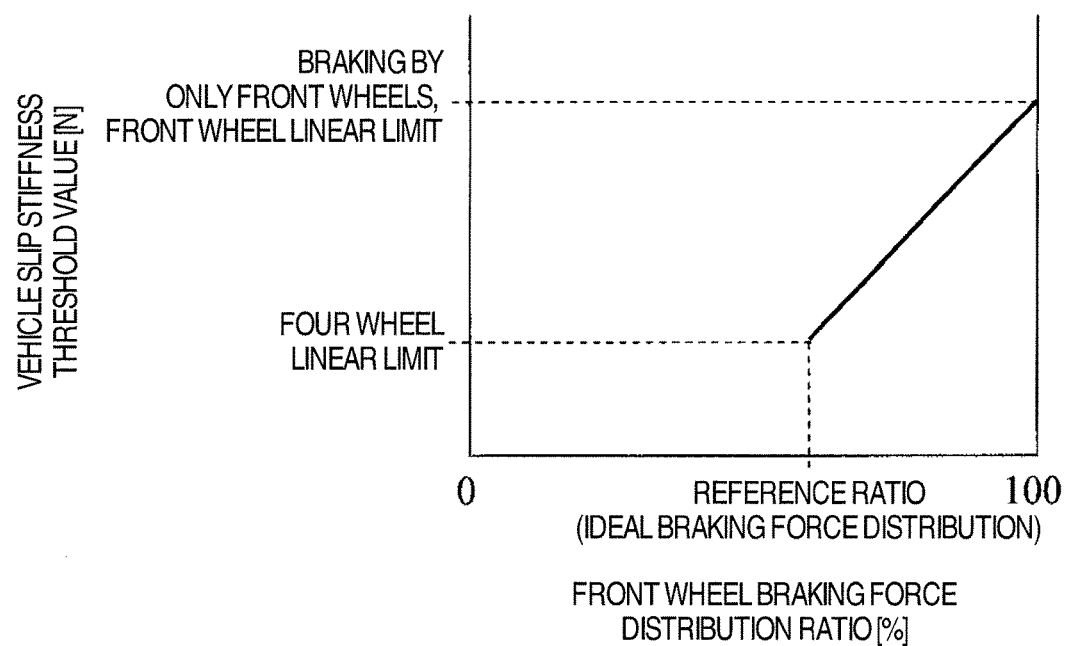
FIG. 19 is a diagram illustrating a method of correcting a vehicle slip stiffness threshold value in the second embodiment.

FIG. 19 illustrates a method of correcting a vehicle slip stiffness threshold value for a braking force ratio of the front and rear wheels calculated by a front/rear wheel braking force ratio calculating unit 20.

In a state in which the braking force ratio of the rear wheels 3 and 4 is larger than a reference ratio, because the vehicle slip stiffness tends to be increased due to the large slip stiffness of the rear wheels 3 and 4, a setting value of the vehicle slip stiffness threshold value is corrected with a value larger than a setting value at about an ideal braking force distribution used as the reference slip stiffness with a vehicle slip stiffness correcting unit 21.

Figure 20A:
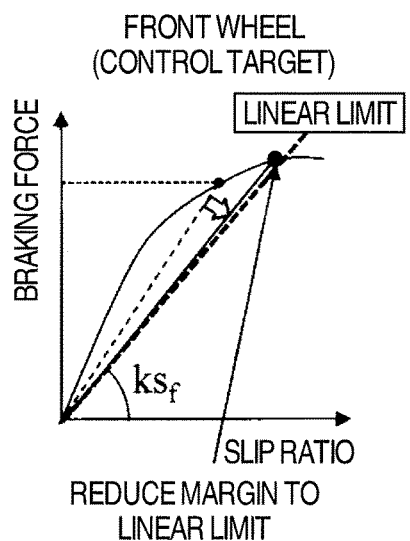
FIG. 20A is a diagram illustrating states of front and rear wheels when a method of correcting a vehicle slip stiffness threshold value in the second embodiment is applied.
Figure 20B:
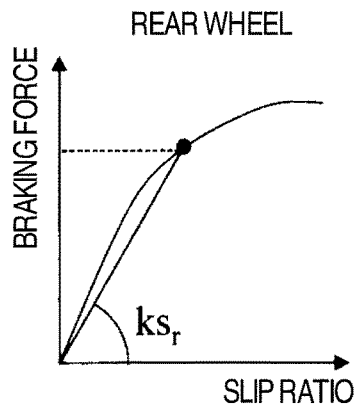
FIG. 20B is a diagram illustrating states of front and rear wheels when a method of correcting a vehicle slip stiffness threshold value in the second embodiment is applied.
Figure 20C:
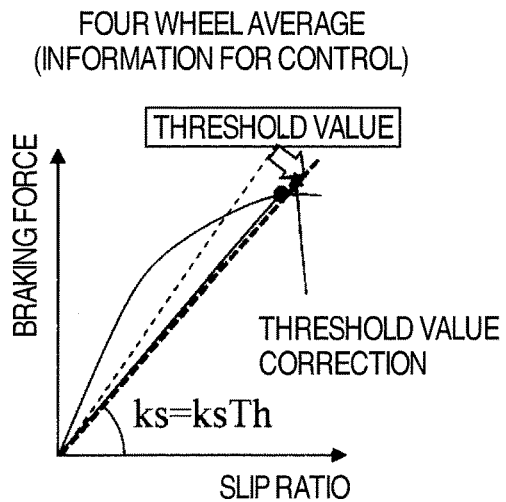
FIG. 20C is a diagram illustrating states of front and rear wheels when a method of correcting a vehicle slip stiffness threshold value in the second embodiment is applied.

FIGS. 20A, 20B, and 20C illustrate states of the front and rear wheels on the tire characteristic curve when the friction braking is performed by the rear wheels 3 and 4 in addition to the regenerative braking of the front wheels 1 and 2, in the case in which correction of the vehicle slip stiffness threshold value is applied. In the front wheels 3 and 4, because the friction braking is performed, the rear wheel slip stiffness ksr has a value smaller than a maximum value (FIG. 20B). The threshold value is corrected by the above method according to the braking force ratio of the front and rear wheels (FIG. 20C), so that the deceleration requested by a driver is obtained while stability of the vehicle behavior in which the regenerative braking is performed by the front wheels 1 and 2 is maintained, using the vehicle slip stiffness as an index, and the regenerative force can be improved (FIG. 20A).

Third Embodiment

Figure 21:
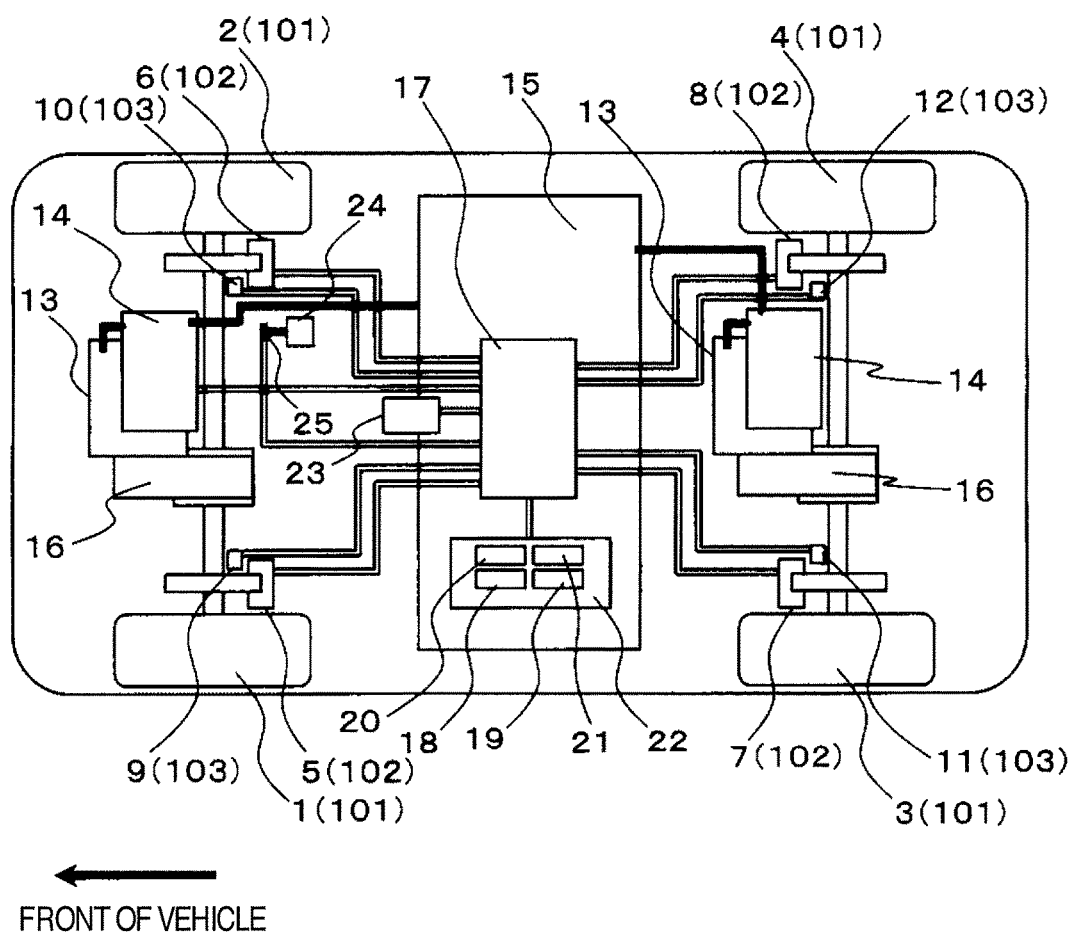
FIG. 21 is a configuration diagram of an EV according to a third embodiment to which the present invention is applied and in which driving and regenerative braking are performed by front and rear wheels and a motor.

FIG. 21 corresponds to a third embodiment and illustrates a configuration of an EV to which a vehicle control apparatus according to the present invention is applied and in which front and rear wheels perform driving and regenerative braking. In the third embodiment, the EV is obtained by integrating the configurations of the first and second embodiments and front wheels 1 and 2 and rear wheels 3 and 4 perform driving and regenerative braking by corresponding motors 13 and 13.

When the third embodiment is applied to a vehicle, regenerative braking at any ratio from regenerative braking by only the front wheels 1 and 2 to regenerative braking by only the rear wheels 3 and 4 is assumed according to a difference of front and rear motor characteristics or a scheme of anteroposterior distribution of regenerative braking force, by a configuration of a driving system.

Figure 22:
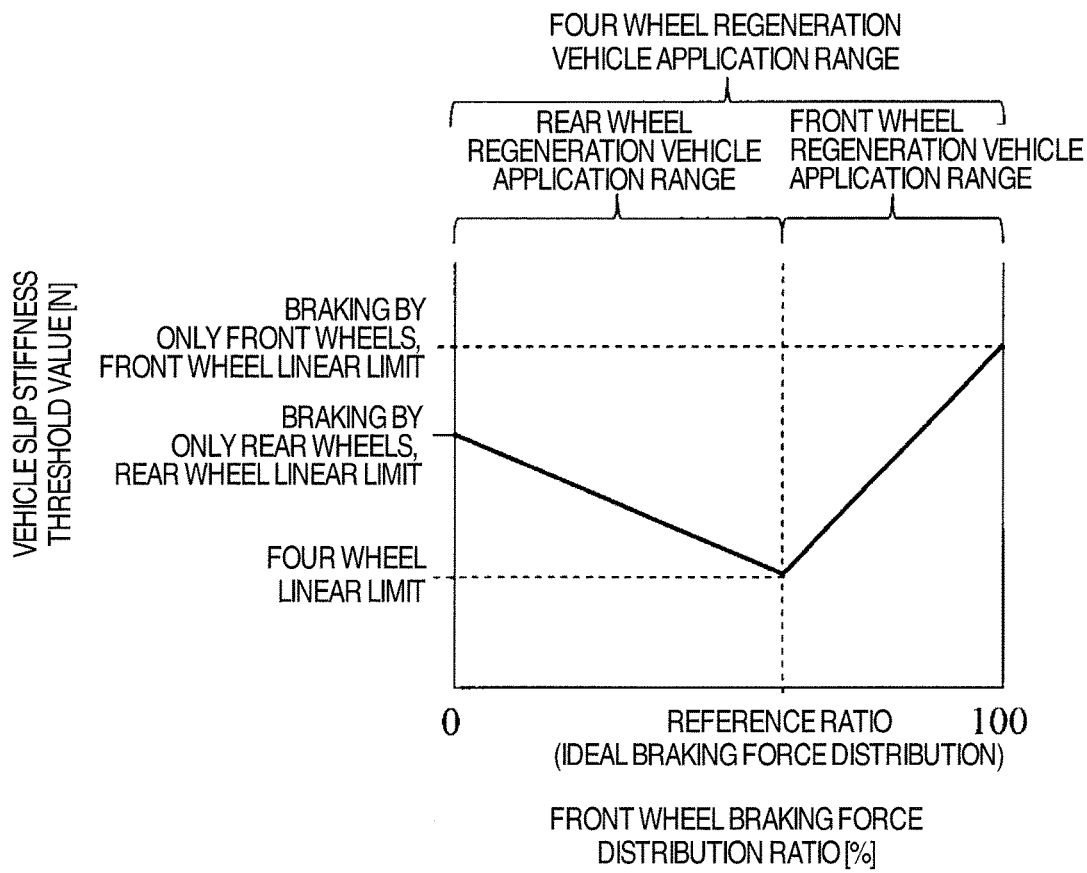
FIG. 22 is a diagram illustrating a method of correcting a vehicle slip stiffness threshold value in the third embodiment.

FIG. 22 illustrates a method of correcting a vehicle slip stiffness threshold value for a braking force ratio of the front and rear wheels calculated by a front/rear wheel braking force ratio calculating unit 20. FIG. 22 illustrates a graph in which use ranges of braking force ratios in a vehicle performing the regenerative braking by only the rear wheels and a vehicle performing the regenerative braking by only the front wheels are combined. That is, FIG. 22 is obtained by combining FIGS. 11A and 19 described above.

In the third embodiment, the deceleration requested by a driver is obtained while stability of the vehicle behavior in which the regenerative braking is performed by the front wheels 1 and 2 and the rear wheels 3 and 4 is maintained, using vehicle slip stiffness as an index, and the regenerative force can be improved.

Fourth Embodiment

As a fourth embodiment, the case in which front wheel slip stiffness and rear wheel slip stiffness can be acquired and control is individually performed will be described.

The fourth embodiment has almost the same configuration as that of the first embodiment. However, a vehicle slip stiffness calculating unit 19 can individually calculate the front wheel slip stiffness and the rear wheel slip stiffness and slip stiffness control can be performed for each of front and rear wheels. That is, the vehicle slip stiffness calculating unit 19 in the fourth embodiment has a front wheel slip stiffness calculating unit to calculate the front wheel slip stiffness and a rear wheel slip stiffness calculating unit to calculate the rear wheel slip stiffness.

Figure 23:
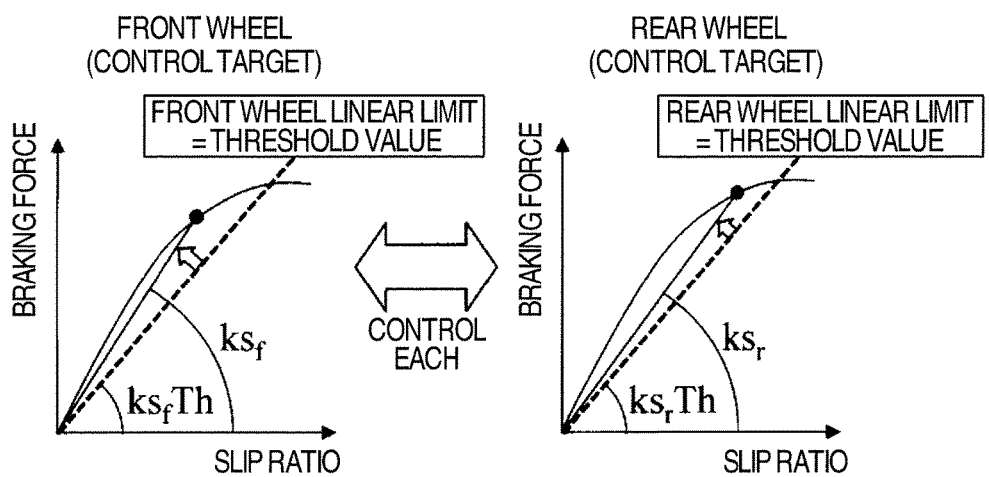
FIG. 23 is a diagram illustrating states of front and rear wheels on a tire characteristic curve and a control method in a fourth embodiment.

FIG. 23 illustrates states of the front and rear wheels on a tire characteristic curve and a control method in the fourth embodiment.

A front wheel slip stiffness threshold value ksfTh and a rear wheel slip stiffness threshold value ksrTh are individually set and when the slip stiffness of any one of the front and rear wheels is smaller than a threshold value by braking, braking force of the corresponding wheels is restricted and braking force of the other wheels is increased. By controlling the slip stiffness of each of the front and rear wheels, the regenerative braking force can be restricted according to necessity to maintain stability of the vehicle while the priority is given to use of the regenerative braking force to generate the deceleration.

Even in this case, threshold values of the slip stiffness of the front and rear wheels can be corrected on the basis of a vehicle model, according to the magnitude of the deceleration obtained by an acceleration sensor 23, and high-precision control is performed.

As such, the vehicle can calculate the slip ratios of the front wheels 1 and 2 and the rear wheels 3 and 4 and the braking/driving force of the front wheels 1 and 2 and the rear wheels 3 and 4 individually. The vehicle includes friction braking devices 102 that become friction braking mechanisms provided in four wheels 101, a motor 13 that becomes a regenerative braking mechanism provided in at least one side of the front wheels 1 and 2 and the rear wheels 3 and 4, a vehicle slip stiffness calculating unit 19, a front/rear wheel braking force ratio calculating unit 20 that becomes a ratio calculating unit, and a regenerative control operation device 22 that is a braking/driving force commanding unit.

The vehicle slip stiffness calculating unit 19 calculates the front wheel slip stiffness and the rear wheel slip stiffness. The front wheel slip stiffness is calculated as an inclination of a straight line coupling the coordinates determined by a front wheel slip ratio and front wheel braking/driving force and an original point on a two-dimensional orthogonal coordinate system in which a vertical axis shows the front wheel braking/driving force and a horizontal axis shows the front wheel slip ratio. The rear wheel slip stiffness is calculated as an inclination of a straight line coupling the coordinates determined by a rear wheel slip ratio and rear wheel braking/driving force and an original point on a two-dimensional orthogonal coordinate system in which a vertical axis shows the rear wheel braking/driving force and a horizontal axis shows the rear wheel slip ratio.

In addition, the regenerative control operation device 22 operates the friction braking device 102 and the motor 13, such that the front wheel slip stiffness is equal to or larger than a front wheel slip stiffness threshold value and the rear wheel slip stiffness is equal to or larger than a rear wheel slip stiffness threshold value.

The front wheel slip stiffness threshold value is front wheel slip stiffness at a linear limit where a tire characteristic showing a relation of the front wheel slip ratio and the front wheel braking/driving force becomes a boundary line between a linear area and a non-linear area. The rear wheel slip stiffness threshold value is rear wheel slip stiffness at a linear limit where a tire characteristic showing a relation of the rear wheel slip ratio and the rear wheel braking/driving force becomes a boundary line between a linear area and a non-linear area.

Thereby, the regenerative braking force can be strengthened to the limit where the stability of the vehicle behavior can be secured and energy saving can be realized.

The embodiments of the present invention have been described in detail. However, the present invention is not limited to the embodiments and various design changes can be performed without departing from the spirit of the present invention described in claims. For example, the embodiments described above are described in detail to facilitate understanding of the present invention and do not need to include all of the configurations described above. In addition, a part of the configurations of the certain embodiment can be replaced by the configurations of other embodiment and the configurations of other embodiments can be added to the configurations of the certain embodiment. In addition, addition, removal, and replacement of other configurations are enabled for a part of the configurations of each embodiment.

For example, the sensor may be replaced by a stroke sensor 25 to detect an operation amount of a brake, detection using a stepping force sensor may be performed, and the friction braking and the regenerative braking may act on the same wheel at the same time. In addition, the present invention can be applied to a vehicle that drives the four wheels 101 independently.

REFERENCE SIGNS LIST

1: front wheel
2: front wheel
3: rear wheel
4: rear wheel
5: front wheel friction braking device
6: front wheel friction braking device
7: rear wheel friction braking device
8: rear wheel friction braking device
9: front wheel velocity sensor
10: front wheel velocity sensor
11: rear wheel velocity sensor
12: rear wheel velocity sensor
13: motor
14: inverter
15: battery
16: gear box
17: brake ECU
18: braking force command value setting unit
19: vehicle slip stiffness calculating unit
20: front/rear wheel braking force ratio calculating unit
21: vehicle slip stiffness correcting unit 22: regenerative control operation device
23: acceleration sensor
24: brake pedal
25: stroke sensor

The invention claimed is:

1. A vehicle control device comprising:
friction braking mechanisms which is provided in front and rear wheels of a vehicle;
a regenerative braking mechanism which is provided on at least one side of the front wheels and the rear wheels of the vehicle;
an average wheel slip ratio calculating unit configured to calculate an average wheel slip ratio of wheel slip ratios of the individual wheels;
an average braking/driving force calculating unit configured to calculate average braking/driving force of braking/driving force of the individual wheels;
a vehicle slip stiffness calculating unit configured to calculate an inclination of a straight line coupling the coordinates determined by the average wheel slip ratio and the average braking/driving force and an original point, on a two-dimensional orthogonal coordinate system in which a vertical axis shows the average braking/driving force and a horizontal axis shows the average slip ratio, as slip stiffness of the vehicle;
a ratio calculating unit configured to calculate a ratio of front wheel braking/driving force and rear wheel braking/driving force;
a vehicle slip stiffness correcting unit configured to correct a control threshold value of the vehicle slip stiffness, according to the ratio of the front wheel braking/driving force and the rear wheel braking/driving force; and
a braking/driving force commanding unit configured to operate the friction braking mechanisms and the regenerative braking mechanism, such that the vehicle slip stiffness becomes the control threshold value.

2. A vehicle control device comprising:
friction braking mechanisms which are provided in front and rear wheels of a vehicle;
a motor which is provided in driving wheels of the front and rear wheels of the vehicle;
an average wheel slip ratio calculating unit configured to calculate an average wheel slip ratio of wheel slip ratios of the individual wheels;
an average braking/driving force calculating unit configured to calculate average braking/driving force of braking/driving force of the individual wheels;
a vehicle slip stiffness calculating unit configured to calculate an inclination of a straight line coupling the coordinates determined by the average wheel slip ratio and the average braking/driving force and an original point, on a two-dimensional orthogonal coordinate system in which a vertical axis shows the average braking/driving force and a horizontal axis shows the average slip ratio, as slip stiffness of the vehicle;
a ratio calculating unit configured to calculate a ratio of driving wheel braking/driving force and non-driving wheel braking force;
a vehicle slip stiffness correcting unit configured to correct a control threshold value of the vehicle slip stiffness, according to the ratio of the driving wheel braking/driving force and the non-driving wheel braking force; and
a braking/driving force commanding unit configured to operate the friction braking mechanisms and the motor, such that the vehicle slip stiffness becomes the control threshold value.

3. The vehicle control device according to claim 1,
wherein the control threshold value is obtained by correcting reference slip stiffness to be the vehicle slip stiffness when slip ratios of the front and rear wheels are equal to each other, according to the ratio calculated by the ratio calculating unit.

4. The vehicle control device according to claim 3,
wherein a state of power distribution in which the slip ratios of the front and rear wheels are equal to each other is set as a reference ratio of the ratio calculated by the ratio calculating unit, and
the vehicle slip stiffness correcting unit corrects the control threshold value, such that the control threshold value increases when a deviation of the ratio calculated by the ratio calculating unit and the reference ratio increases.

5. The vehicle control device according to claim 3, comprising:
a reference ratio correcting unit configured to correct the reference ratio according to a vehicle state.

6. The vehicle control device according to claim 5, comprising:
a deceleration calculating unit configured to calculate deceleration acting on the vehicle,
wherein the reference ratio correcting unit corrects the reference ratio according to the deceleration.

7. The vehicle control device according to claim 5, comprising:
a friction coefficient calculating unit configured to calculate a friction coefficient of a road surface on which the vehicle travels,
wherein the reference ratio correcting unit corrects the reference ratio according to the friction coefficient.

8. The vehicle control device according to claim 3, comprising:
a rear wheel slip stiffness calculating unit configured to calculate an inclination of a straight line coupling the coordinates determined by a rear wheel slip ratio and rear wheel braking/driving force and an original point, on a two-dimensional orthogonal coordinate system in which a vertical axis shows the braking/driving force of the rear wheels and a horizontal axis shows the slip ratio of the rear wheels, as slip stiffness of the rear wheels,
wherein the rear wheel braking/driving force is restricted when the rear wheel slip stiffness is smaller than the reference slip stiffness.

9. The vehicle control device according to claim 3, comprising:
a front wheel slip stiffness calculating unit configured to calculate an inclination of a straight line coupling the coordinates determined by a front wheel slip ratio and front wheel braking/driving force and an original point, on a two-dimensional orthogonal coordinate system in which a vertical axis shows the braking/driving force of the front wheels and a horizontal axis shows the slip ratio of the front wheels, as slip stiffness of the front wheels,
wherein the rear wheel braking/driving force is restricted when the front wheel braking/driving force is equal to or larger than a predetermined value and the front wheel slip stiffness is larger than the reference slip stiffness.

10. The vehicle control device according to claim 3, comprising:
- a front wheel slip stiffness calculating unit configured to calculate an inclination of a straight line coupling the coordinates determined by a front wheel slip ratio and front wheel braking/driving force and an original point, on a two-dimensional orthogonal coordinate system in which a vertical axis shows the braking/driving force of the front wheels and a horizontal axis shows the slip ratio of the front wheels, as slip stiffness of the front wheels; and
- a braking/driving force difference calculating unit configured to calculate a braking/driving force difference between the front and rear wheels,
- wherein the rear wheel braking/driving force is restricted when the braking/driving force difference is equal to or smaller than a predetermined deviation and the front wheel slip stiffness is larger than the reference slip stiffness.

11. The vehicle control device according to claim 1, wherein the regenerative braking device is provided for the rear wheels.

12. The vehicle control device according to claim 2, wherein the motor is provided for the rear wheels.

13. A vehicle control device comprising:
- friction braking mechanisms which are provided in front and rear wheels of a vehicle;
- a regenerative braking mechanism which is provided on at least one side of the front wheels and the rear wheels of the vehicle;
- a slip ratio calculating unit configured to calculate a slip ratio of the front wheels and a slip ratio of the rear wheels;
- a braking/driving force calculating unit configured to calculate front wheel braking/driving force to be braking/driving force of the front wheels and rear wheel braking/driving force to be braking/driving force of the rear wheels;
- a front wheel slip stiffness calculating unit configured to calculate an inclination of a straight line coupling the coordinates determined by the front wheel slip ratio and the front wheel braking/driving force and an original point, on a two-dimensional orthogonal coordinate system in which a vertical axis shows the front wheel braking/driving force and a horizontal axis shows the front wheel slip ratio, as slip stiffness of the front wheels;
- a rear wheel slip stiffness calculating unit configured to calculate an inclination of a straight line coupling the coordinates determined by the rear wheel slip ratio and the rear wheel braking/driving force and an original point, on a two-dimensional orthogonal coordinate system in which a vertical axis shows the rear wheel braking/driving force and a horizontal axis shows the rear wheel slip ratio, as slip stiffness of the rear wheels; and
- a braking/driving force commanding unit configured to operate the friction braking mechanisms and the regenerative braking mechanism, such that the front wheel slip stiffness is equal to or larger than a predetermined front wheel control threshold value and the rear wheel slip stiffness is equal to or larger than a predetermined rear wheel control threshold value.

14. The vehicle control device according to claim 13, comprising:
- a deceleration calculating unit configured to calculate deceleration acting on the vehicle,
- wherein the front wheel control threshold value and the rear wheel control threshold value are corrected according to the deceleration.

15. The vehicle control device according to claim 13, wherein the front wheel slip stiffness at a linear limit where a tire characteristic showing a relation of the front wheel slip ratio and the front wheel braking/driving force becomes a boundary line of a linear area and a non-linear area is set as the front wheel control threshold value, and
the rear wheel slip stiffness at a linear limit where a tire characteristic showing a relation of the rear wheel slip ratio and the rear wheel braking/driving force becomes a boundary line of a linear area and a non-linear area is set as the rear wheel control threshold value.

16. The vehicle control device according to claim 2, wherein the control threshold value is obtained by correcting reference slip stiffness to be the vehicle slip stiffness when slip ratios of the front and rear wheels are equal to each other, according to the ratio calculated by the ratio calculating unit.

* * * * *